(12) United States Patent
Jia et al.

(10) Patent No.: US 12,713,320 B2
(45) Date of Patent: Aug. 18, 2026

(54) METHOD AND APPARATUS FOR PROCESSING RADIO LINK FAILURE

(71) Applicant: 1FINITY Inc., Kawasaki (JP)

(72) Inventors: Meiyi Jia, Beijing (CN); Guorong Li, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 275 days.

(21) Appl. No.: 18/370,985

(22) Filed: Sep. 21, 2023

(65) Prior Publication Data

US 2024/0015629 A1 Jan. 11, 2024

Related U.S. Application Data

(63) Continuation of application No. PCT/CN2021/084789, filed on Mar. 31, 2021.

(51) Int. Cl.
*H04W 36/30* (2009.01)
*H04W 36/08* (2009.01)

(52) U.S. Cl.
CPC ......... *H04W 36/305* (2018.08); *H04W 36/08* (2013.01)

(58) Field of Classification Search
None
See application file for complete search history.

(56) References Cited

U.S. PATENT DOCUMENTS 12,058,758 B2 * 8/2024 Yang .................. H04W 36/362
2019/0223073 A1 * 7/2019 Chen ................ H04W 36/0077
2022/0312282 A1 9/2022 Chang et al.
2022/0322173 A1 * 10/2022 Chang ................ H04W 36/305
2022/0338087 A1 * 10/2022 Uchino ................ H04W 76/19
2023/0059975 A1 * 2/2023 Wu ...................... H04W 48/20
2023/0164886 A1 * 5/2023 Gardner .................. H05B 3/06 392/484
2023/0319938 A1 * 10/2023 Wu ...................... H04W 76/20 370/329

FOREIGN PATENT DOCUMENTS

CN 111294766 A 6/2020
CN 112087785 A 12/2020
(Continued)

OTHER PUBLICATIONS

Notice of Reasons for Refusal issued by the Japan Patent Office for corresponding Japanese Patent Application No. 2023-558265, mailed on Aug. 27, 2024, with an English translation.
(Continued)

*Primary Examiner* — Shukri Taha
(74) *Attorney, Agent, or Firm* — Myers Wolin, LLC

(57) ABSTRACT

An apparatus for processing a radio link failure, applicable to a terminal equipment includes a detector configured to detect or trigger a radio link failure, and first selecting processor circuitry configured to perform cell selection, wherein the first selecting processor circuitry prioritizes a conditional reconfiguration candidate cell to select, or second selecting processor circuitry configured to perform cell selection; and first reselecting processor circuitry configured to perform cell reselection when a selected cell is not a conditional reconfiguration candidate cell, or first executing processor circuitry configured to attempt conditional reconfiguration execution.

19 Claims, 20 Drawing Sheets

(56) References Cited

FOREIGN PATENT DOCUMENTS

| | | | | |
|---|---|---|---|---|
| CN | 112584552 A | | 3/2021 | |
| WO | WO-2020057732 A1 | * | 3/2020 | .......... H04W 36/305 |
| WO | 2020261462 A1 | | 12/2020 | |
| WO | 2021/013170 A1 | | 1/2021 | |
| WO | 2021/029053 A1 | | 2/2021 | |
| WO | WO-2021029713 A1 | * | 2/2021 | .......... H04W 36/362 |

OTHER PUBLICATIONS

Quectel, "Discussions on VarRLF-Report Setting", Agenda Item: 6.9.3.2, 3GPP TSG-RAN WG2 #109bis-e, R2-2002599, Electronic meeting, Apr. 20-30, 2020.

International Search Report and Written Opinion of the International Searching Authority issued by the China National Intellectual Property Administration for corresponding International Patent Application No. PCT/CN2021/084789, mailed on Dec. 30, 2021 with English translation.

CATT, "Discussion on the Working Assumption Related Issues", Agenda Item: 6.9.3.2, 3GPP TSG-RAN WG2 Meeting #107bis, R2-1912132, Chongqing, P. R. China, Oct. 14-18, 2019.

VIVO, "Discussion on the timer design for CHO", Agenda Item: 6.9.3.2, 3GPP TSG-RAN WG2 Meeting #107bis, R2-1912454, Chongqing, P. R. China, Oct. 14-18, 2019.

Lenovo et al., "Failure handling with CHO candidate", 3GPP TSG-RAN WG2 Meeting #107bis, R2-1913089, revision of R2-1910615, Chongqing, P. R. China, Oct. 14-18, 2019.

* cited by examiner

2001 attempting conditional reconfiguration execution once when AS security has been activated and an SRB2 and at least one DRB have been setup, or, for an IAB, when AS security has been activated and an SRB2 has been setup, and when a timer T316 is not configured or SCG transmission is suspended or PSCell change is ongoing, a third condition is fulfilled for a conditional reconfiguration candidate cell and the network configured the terminal equipment to try conditional reconfiguration execution or other similar behaviors after the radio link failure

FIG. 20

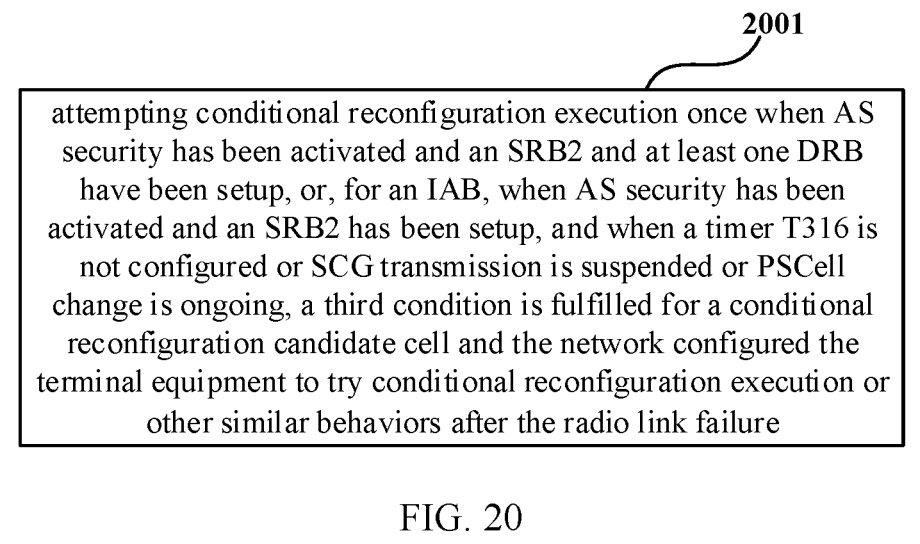

when AS security has been activated and SRB2 and at least one DRB have been setup, or for IAB, when AS security has been activated and SRB2 has been setup, and when timer T316 is not configured or SCG transmission is suspended and PSCell change is performed, the third condition is fulfilled for more than one conditional reconfiguration candidate cell and the network configured the terminal equipment to try conditional reconfiguration execution or other similar behaviors after a radio link failure, selecting one of the more than one conditional reconfiguration candidate cell and attempting conditional reconfiguration execution once

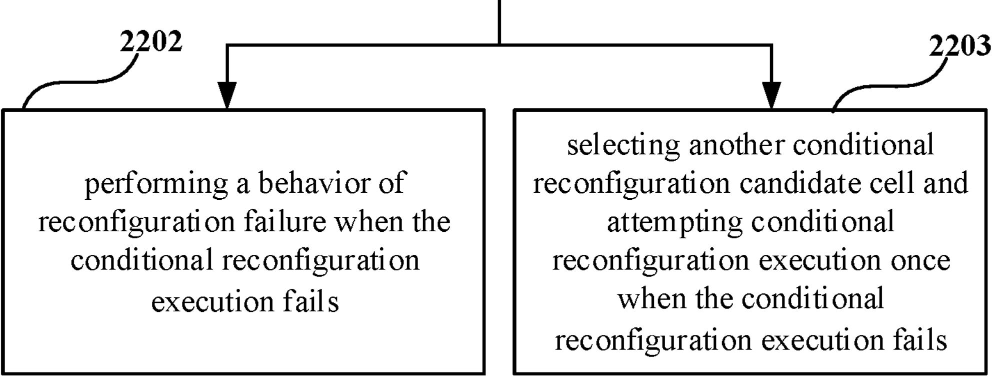

FIG. 22

2301 configuring a terminal equipment to attempt conditional reconfiguration execution after a radio link fail and/or configuring the terminal equipment with information on a conditional reconfiguration candidate cell

FIG. 23

METHOD AND APPARATUS FOR PROCESSING RADIO LINK FAILURE

CROSS-REFERENCE TO RELATED APPLICATION

This application is a continuation application of International Application PCT/CN2021/084789 filed on Mar. 31, 2021, and designated the U.S., the entire contents of which are incorporated herein by reference.

TECHNICAL FIELD

This disclosure relates to the field of communications.

BACKGROUND

In NR (New Radio), a terminal equipment may consider that a radio link failure (RLF) is detected when one of the following conditions is fulfilled: timer T310 or T312 in a special cell expires; a random access problem indication from an MAC (media access control) layer is received, and timers T300, T301, T304, T311 and T319 are not running; an indication that a maximum number of retransmissions has been reached from an RLC (radio link control) layer is received; a BAP entity receives a backhaul (BH) radio link failure indication if it is connected as an IAB-node; and a consistent uplink LBT (listen before talk) failure indication from the MAC layer is received, while timer T304 is not running.

If the terminal equipment is not configured with dual connectivity (DC), or if the terminal equipment is configured with dual connectivity and the above conditions occur in a master cell group (MCG) or a secondary cell (PCell), the terminal equipment considers that the master cell group has detected a radio link failure; and if the terminal equipment is configured with dual connectivity and the above conditions occur in a secondary cell group (SCG) or a primary secondary cell (PSCell), the terminal equipment considers that the secondary cell group has detected a radio link failure.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In a case where the master cell group (MCG) detects a radio link failure, if AS security has been activated and SRB2 and at least one DRB have been setup, or SRB2 has been setup for IAB, if timer T316 is configured, transmission of the secondary cell group (SCG) is not suspended and there is no change in the primary secondary cell (PSCell), the terminal equipment will initiate a master cell group (MCG) failure information procedure to report a radio link failure of the master cell group (MCG); otherwise, the terminal equipment will initiate a connection reestablishment procedure.

In a case where the secondary cell group (SCG) detects a radio link failure, if transmission of the master cell group (MCG) is not suspended, the terminal equipment will initiate a secondary cell group failure information procedure to report the radio link failure of the secondary cell group (SCG); otherwise, the terminal equipment will initiate a connection reestablishment procedure.

During the connection reestablishment procedure, the terminal equipment remains in a connected state and performs cell selection. If a selected cell is a conditional handover (CHO) candidate cell and the network configures that the terminal equipment attempts conditional handover after the radio link failure, the terminal equipment attempts conditional handover execution; otherwise, it performs connection reestablishment on the selected cell.

If a suitable cell is not found within a period of time after determining the radio link failure (timer T311 expires), the UE enters an idle state.

It was found by the inventors that after triggering a radio link failure, in order to perform radio link failure recovery, the terminal equipment may initiate a connection reestablishment procedure, it remains connected and performs cell selection. If the selected cell is a conditional handover (CHO) candidate cell and the network device configures that the terminal equipment attempts conditional handover after the radio link failure, the terminal equipment will attempt conditional handover execution; otherwise, it performs connection reestablishment on the selected cell.

However, in the cell selection, once a suitable cell is found, such as a cell fulfilling the S criterion, the terminal equipment will select this cell. Even if the network configures that the terminal equipment attempts conditional handover after the radio link failure, the probability of selecting a conditional handover candidate cell in the cell selection is very low, which makes it highly likely that the terminal equipment needs to perform connection reestablishment on a selected non-conditional handover candidate cell, thereby incurring significant service interruption.

In order to solve one or more of the above problems, embodiments of this disclosure provide a method and apparatus for processing a radio link failure.

According to a first aspect of the embodiments of this disclosure, there is provided an apparatus for processing a radio link failure, applicable to a terminal equipment, the apparatus including: a detecting unit configured to detect or trigger a radio link failure; and a first selecting unit configured to perform cell selection, wherein the first selecting unit prioritizes a conditional reconfiguration candidate cell to select; or a second selecting unit configured to perform cell selection; and a first reselecting unit configured to perform cell reselection when a selected cell is not a conditional reconfiguration candidate cell; or a first executing unit configured to attempt conditional reconfiguration execution.

According to a second aspect of the embodiments of this disclosure, there is provided an apparatus for processing radio link failures, applicable to a network device, the apparatus including: a first configuring unit configured to configure a terminal equipment to attempt conditional reconfiguration execution after a radio link fail and/or configure the terminal equipment with information on a conditional reconfiguration candidate cell.

According to a third aspect of the embodiments of this disclosure, there is provided a terminal equipment, including the apparatus as described in the first aspect of the embodiments of this disclosure.

According to a fourth aspect of the embodiments of this disclosure, there is provided a network device, including the apparatus as described in the second aspect of the embodiments of this disclosure.

According to a fifth aspect of the embodiments of this disclosure, there is provided a communication system, including the terminal equipment as described in the third aspect of the embodiments of this disclosure and or the network device as described in the fourth aspect of the embodiments of this disclosure.

According to a sixth aspect of the embodiments of this disclosure, there is provided a method for processing a radio link failure, applicable to a terminal equipment, the method including: detecting or triggering a radio link failure; and performing cell selection, wherein prioritizing a conditional reconfiguration candidate cell to select; or performing cell selection; and performing cell reselection when a selected cell is not a conditional reconfiguration candidate cell; or attempting conditional reconfiguration execution.

According to a seventh aspect of the embodiments of this disclosure, there is provided a method for processing radio link failures, applicable to a network device, the method including: configuring a terminal equipment to attempt conditional reconfiguration execution after a radio link fail and/or configuring the terminal equipment with information on a conditional reconfiguration candidate cell.

According to an eighth aspect of the embodiments of this disclosure, there is provided a computer readable program, which, when executed in an apparatus for processing a radio link failure or a terminal equipment, will cause the apparatus for processing a radio link failure or terminal equipment to carry out the method for processing a radio link failure as described in the sixth aspect of the embodiments of this disclosure.

According to a ninth aspect of the embodiments of this disclosure, there is provided a computer readable medium, including a computer readable program, which will cause an apparatus for processing a radio link failure or terminal equipment to carry out the method for processing a radio link failure as described in the sixth aspect of the embodiments of this disclosure.

According to a tenth aspect of the embodiments of this disclosure, there is provided a computer readable program, which, when executed in an apparatus for processing radio link failures or a network device, will cause the apparatus for processing radio link failures or the network device to carry out the method for processing radio link failures as described in the seventh aspect of the embodiments of this disclosure.

According to an eleventh aspect of the embodiments of this disclosure, there is provided a computer readable medium, including a computer readable program, which will cause an apparatus for processing radio link failures or a network device to carry out the method for processing radio link failures as described in the seventh aspect of the embodiments of this disclosure.

An advantage of the embodiments of this disclosure exists in that when a radio link failure is detected or triggered, prioritizing a conditional reconfiguration candidate cell to select; or, when the selected cell is not a conditional reconfiguration candidate cell, cell reselection is performed; or, directly attempting conditional reconfiguration execution without performing cell selection, which is able to prioritizing a conditional reconfiguration cell to select and/or prioritizing conditional reconfiguration execution to attempt, thereby avoiding significant service interruption and improving system performance and user experiences.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 20 is a schematic diagram of a method for executing step 705 of Embodiment 1 of this disclosure;

FIG. 22 is another schematic diagram of executing step 705 of Embodiment 1 of this disclosure;

FIG. 23 is a schematic diagram of the method for processing radio link failures of Embodiment 2 of this disclosure;

DETAILED DESCRIPTION

Figure 1:
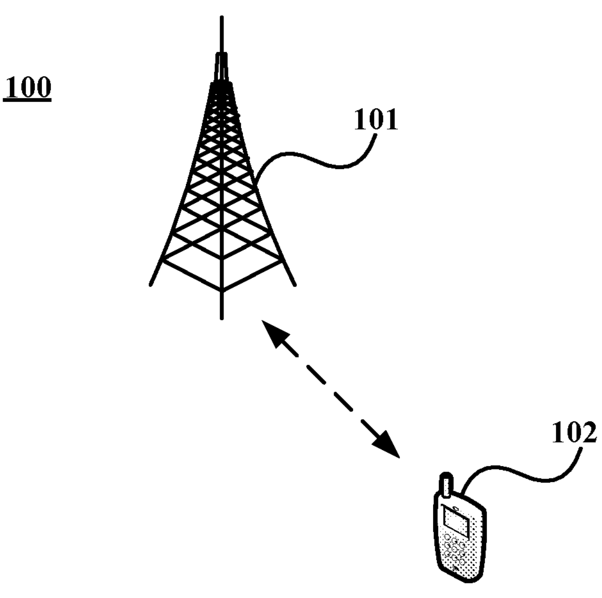
FIG. 1 is schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network fulfilling any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following devices: a node and/or donor in an IAB architecture, a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" refers to, for example, an equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc., such as a terminal equipment served by an IAB-node or IAB-donor under an IAB architecture.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In the embodiments of this disclosure, all of "when . . . ", "in a case where . . . ", "for a case where . . . " and "if . . . " denote one or some conditions or states, and furthermore, all of these expressions are interchangeable.

Scenarios of the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, the communication system 100 may include a network device 101 and a terminal equipment 102. For the sake of simplicity, an example having only one terminal equipment is schematically given in FIG. 1. The network device 101 is, for example, a network device gNB in NR.

In the embodiment of this disclosure, existing traffics or traffics that may be implemented in the future may be performed between the network device 101 and the terminal equipment 102. For example, such traffics may include but not limited to enhanced mobile broadband (eMBB), massive machine type communication (MTC), and ultra-reliable and low-latency communication (URLLC), etc. For example, the terminal equipment 102 considers that a radio link failure is detected.

After triggering a radio link failure, in order to perform radio link failure recovery, the terminal equipment 102 may possibly initiate a connection reestablishment procedure, i.e. remaining connected and performing cell selection. If the selected cell is a conditional handover (CHO) candidate cell and the network device configures that the terminal equipment 102 attempts conditional handover after the radio link failure, the terminal equipment 102 will attempt conditional handover execution; otherwise, it performs connection reestablishment on the selected cell.

However, in the cell selection, as long as a suitable cell is found, such as a cell fulfilling the S criterion, the terminal equipment 102 will select this cell. Even if the network configures that the terminal equipment 102 attempts conditional handover after the radio link failure, is is less possible that the selected cell in the cell selection is a conditional handover candidate cell, which makes it highly likely that the terminal equipment 102 needs to perform connection reestablishment on a selected non-conditional handover candidate cell, thereby incurring significant service interruption.

In addition, the method and apparatus for processing a radio link failure of the embodiments of this disclosure may also be applicable to an IAB architecture.

Integrated access and backhaul (IAB) ensures wireless relay in NG-RAN. A relay node, namely, an IAB-node, supports NR access and backhauling. The backhauling may include a single hop or multiple hops. An end point of network side NR backhauling, namely, an IAB-donor, refers to a gNB that supports additional functions of the IAB. The IAB-donor may also be referred to as an IAB-donor node.

The IAB-node supports functions of a gNB-DU (distributed unit), i.e. an IAB-DU. The IAB-DU terminates an NR access interface to a terminal equipment and a next hop of IAB-node, and terminates an F1 protocol of a gNB-CU function on the IAB-donor. In addition, the IAB-node also supports a subset of terminal equipment functions (UE functions), namely, IAB-MT, which includes, for example, functions of a gNB-DU connected to another IAB-node or the IAB-donor, a gNB-CU (centralized unit) connected to the IAB-donor and a physical layer, layer 2 (L2), RRC (radio resource control) and NAS (non-access stratum) connected to a core network.

The IAB-node is connected to an IAB-donor via one or more hops. In topology, the IAB-donor is a root node, a neighboring node on the IAB-DU interface of the IAB-node is referred to as a descendant node of the IAB-node, i.e. a descendant IAB-node, and a neighboring node on an IAB-MT interface is referred to as a parent node, i.e. a parent IAB-node.

Figure 2:
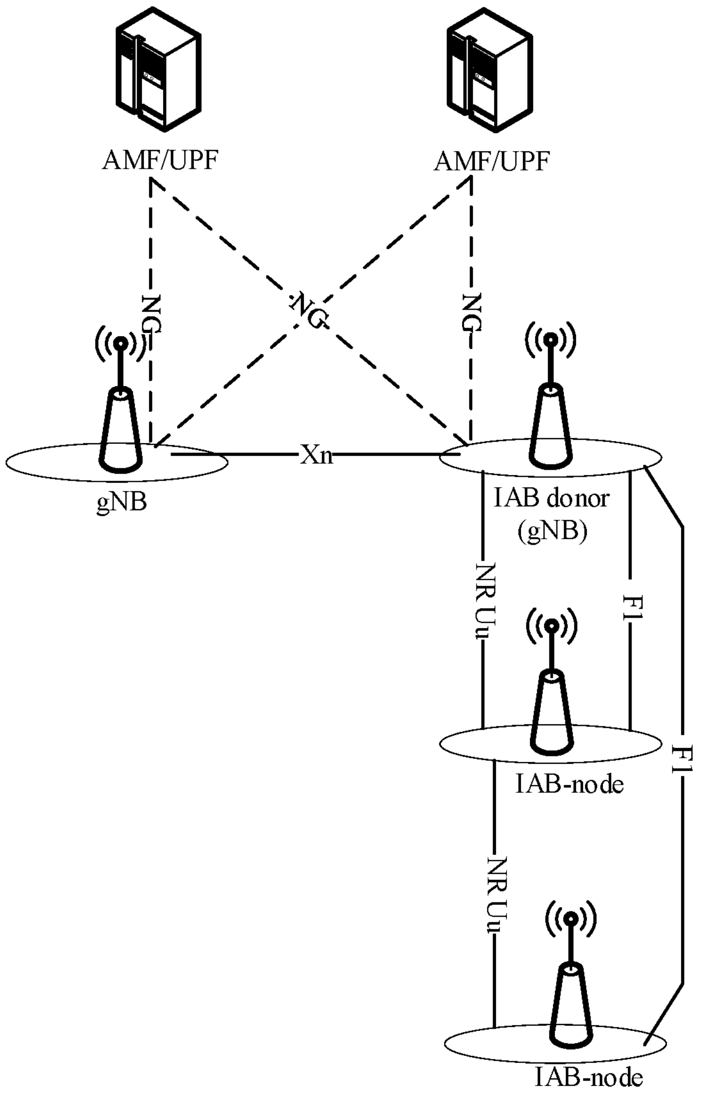
FIG. 2 is a schematic diagram of an overall architecture of IAB of the embodiment of this disclosure.
Figure 3:
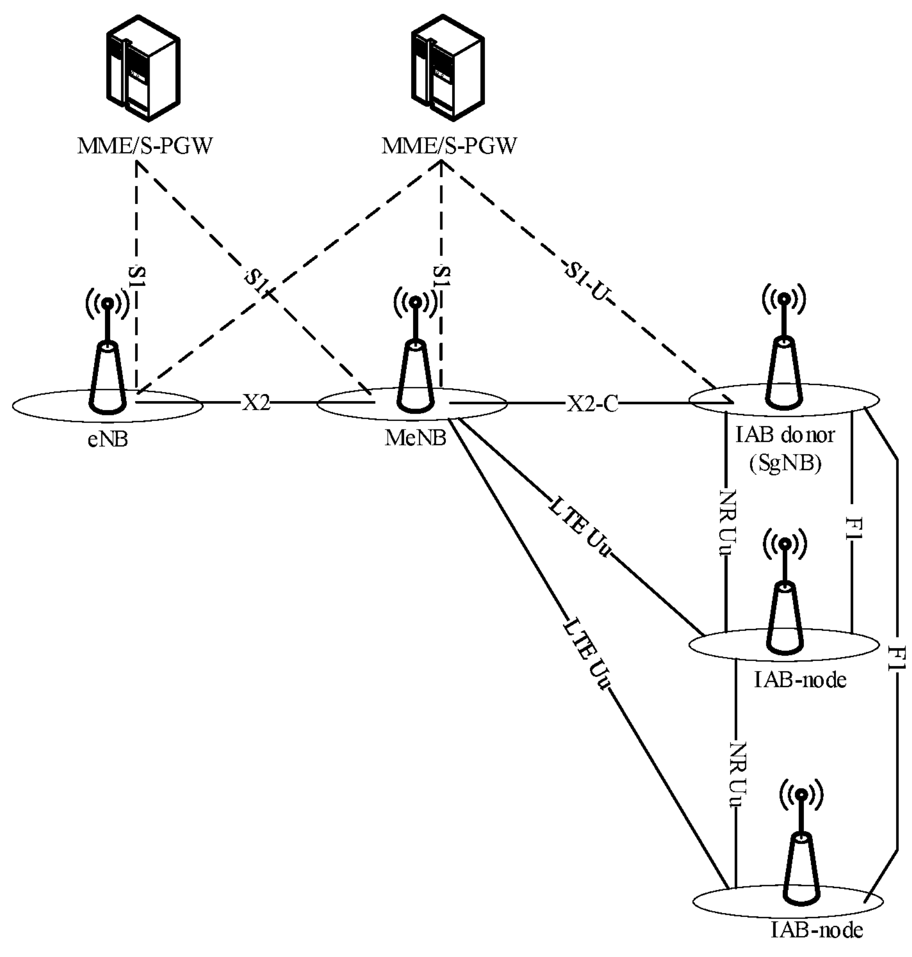
FIG. 3 is another schematic diagram of the overall architecture of the IAB of the embodiment of this disclosure.

FIG. 2 is a schematic diagram of an overall architecture of an IAB in an embodiment of this disclosure. As shown in FIG. 2, the overall architecture of the IAB is in a duplex (SA) mode. FIG. 3 is another schematic diagram of the overall architecture of the IAB of the embodiment of this disclosure. As shown in FIG. 3, the overall architecture of the IAB is in a dual-connectivity (EN-DC) mode. In the dual-connectivity mode, the IAB-node is connected to an MeNB via E-UTRA, and an IAB-donor terminates X2-C as an SgNB.

Figure 4:
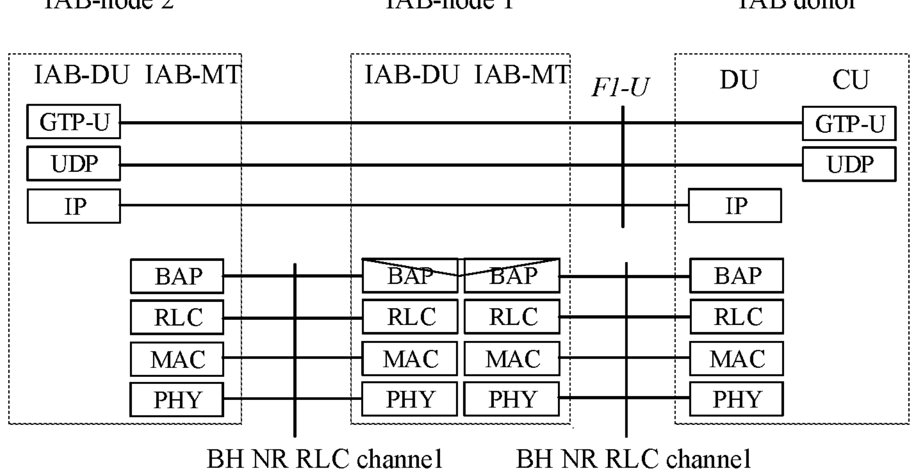
FIG. 4 is a schematic diagram of a protocol stack of an F1-U interface between an IAB-DU and an IAB-donor-CU.
Figure 5:
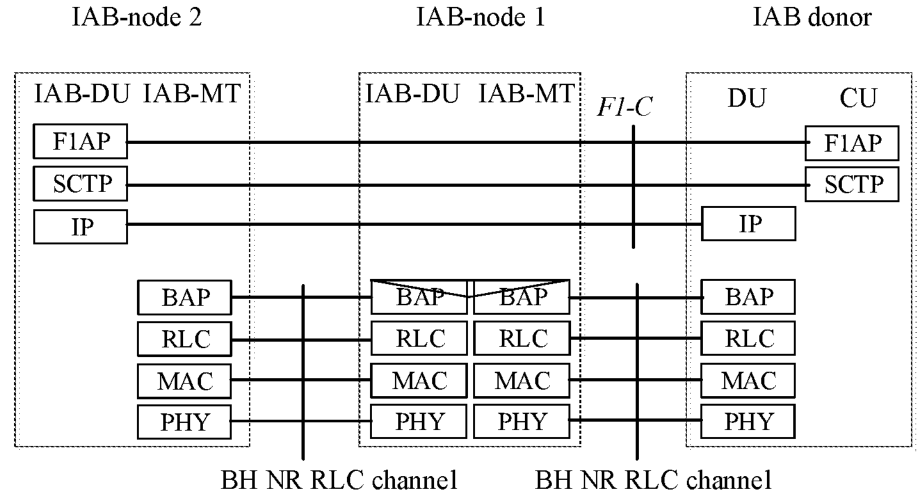
FIG. 5 is a schematic diagram of a protocol stack of an F1-C interface between the IAB-DU and the IAB-donor-CU.

FIG. 4 is a schematic diagram of a protocol stack of an F1-U interface between an IAB-DU and an IAB-donor-CU, and FIG. 5 is a schematic diagram of a protocol stack of an F1-C interface between an IAB-DU and an IAB-donor-CU. In FIG. 4 and FIG. 5, F1-U and F1-C are illustrated by taking 2-hop backhauling as an example.

In the embodiment of this disclosure, F1-U and F1-C use an IP transmission layer between the IAB-DU and IAB-donor-CU. In addition, F1-U and F1-C have security protection.

In the embodiment of this disclosure, the IP layer transmits via a backhaul adaptation protocol (BAP) sublayer on wireless backhauling to ensure multi-hop routing; and the IP layer may also be used for non-F1 services, such as operation administration and maintenance (OAM) services.

In the embodiment of this disclosure, BAP PDUs are transmitted via BH RLC channels on each backhaul link, and on each BH link, multiple BH RLC channels may be configured to allow traffic prioritization and QoS (quality of service) enforcement.

In the embodiment of this disclosure, each IAB-node and a BAP entity on the IAB-donor-DU perform mapping of the BH RLC channels of the BAP PDUs.

Figure 6:
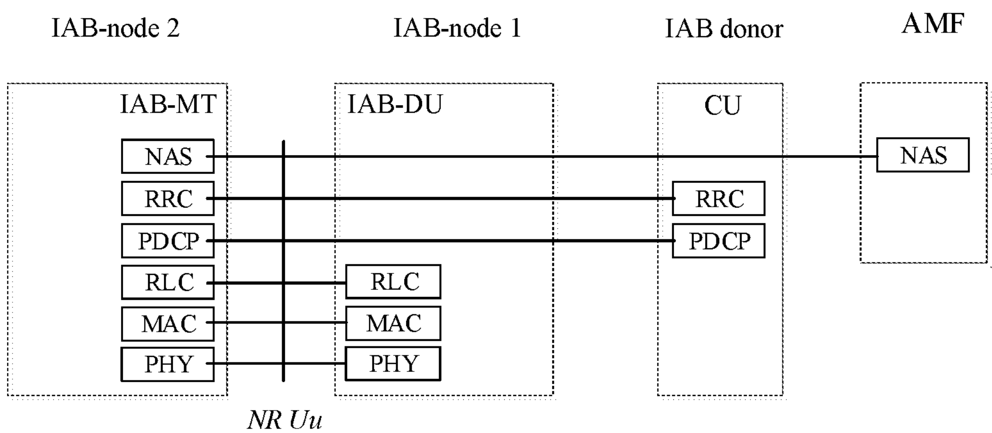
FIG. 6 is a schematic diagram of a protocol stack of an SRB between an IAB-MT and the IAB-donor-CU.

In the embodiment of this disclosure, the IAB-MT and IAB-donor-CU establish SRBs for carrying RRC and NAS. FIG. 6 is a schematic diagram of a protocol stack of the SRBs between the IAB-MT and the IAB-donor-CU of the embodiment of this disclosure.

In the embodiment of this disclosure, for the IAB-node operating in the EN-DC mode, the IAB-MT also establishes one or more DRBs with the IAB-donor-CU, which may be used to transmit OAM services, for example. For the SA mode, establishment of DRBs is optional. These SRBs and DRBs are transmitted between the IAB-MT and its parent node via a Uu interface channel.

Under the IAB architecture, in some cases, migration of an IAB-node is needed. The migration of the IAB-node may also be referred to as topology adaptation of the IAB-node. For example, it is decided to migrate an IAB-node from or original path to a new path after measuring link quality. The original path is referred to as a source path, the new path is referred to as a target path, and the IAB-node to be migrated is referred to as a migrated IAB-node.

A migration or topology adaptation scenario of an IAB-node may include migration or topology adaptation within an IAB-donor-CU and migration or topology adaptation between IAB-donor-CUs. For example, when migration of an IAB-node is performed within an IAB-donor-CU or between IAB-donor-CUs, a relatively long time is needed. If a radio link of the IAB-MT deteriorates rapidly, the migration may possibly fail. In this case, according to an existing mechanism, the terminal equipment performs radio link failure (RLF) recovery via RRC reestablishment, which will cause long-term service interruption, and experiences of users served by this IAB-node and its descendant IAB-nodes will be lowered.

Various implementations of the embodiments of this disclosure shall be described below with reference to the accompanying drawings. These implementations are illustrative only, and are not intended to limited this disclosure.

Embodiment 1

The embodiment of this disclosure provides a method for processing a radio link failure, applicable to a terminal equipment. For example, the method is applicable to the terminal equipment 102 in FIG. 1.

In this embodiment, the method is also applicable to an IAB-MT of an IAB-node, and an application method is similar to that of the terminal equipment.

In this embodiment, description shall be given by taking a terminal equipment as an example. Reference may be made to implementation of the terminal equipment for implementation of the IAB-MT of the IAB-node.

Figure 7:
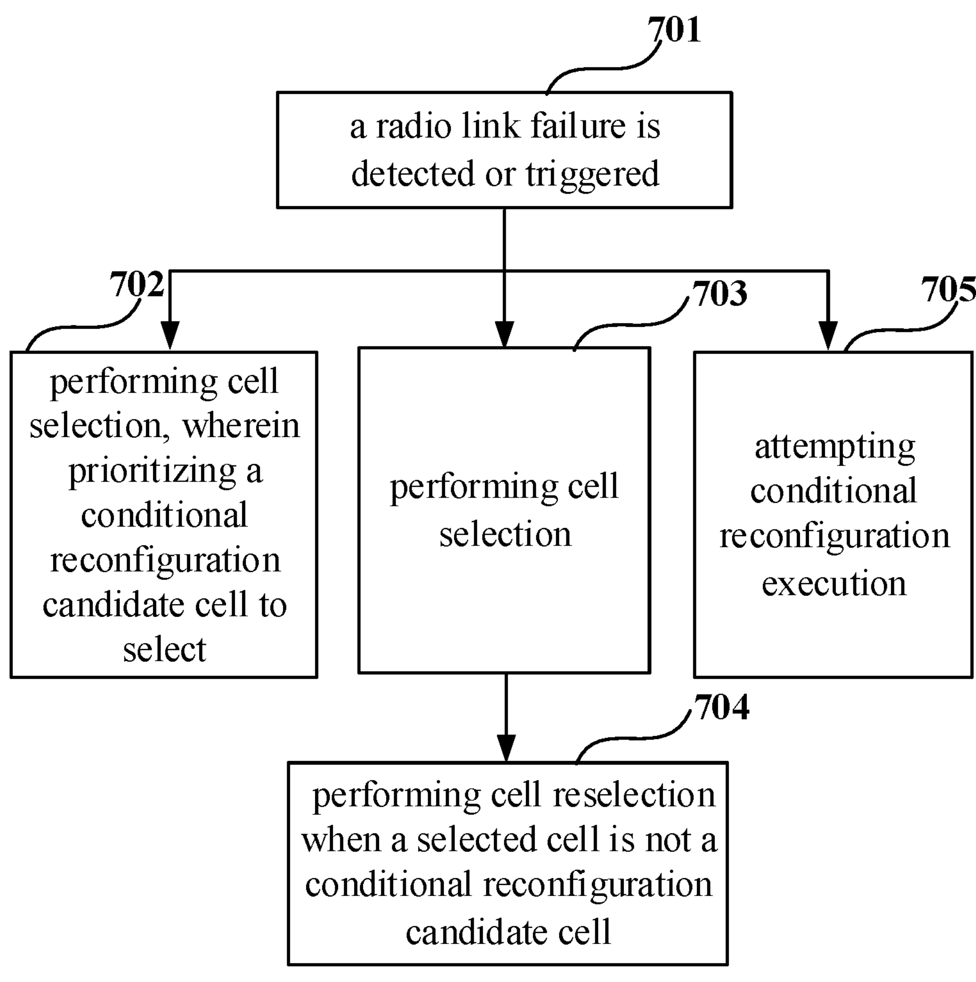
FIG. 7 is a schematic diagram of the method for processing a radio link failure of Embodiment 1 of this disclosure.

FIG. 7 is a schematic diagram of the method for processing a radio link failure of Embodiment 1 of this disclosure. As shown in FIG. 7, the method includes:

step 701: a radio link failure is detected or triggered; and step 702: performing cell selection, wherein prioritizing a conditional reconfiguration candidate cell to select; or step 703: performing cell selection; and step 704: performing cell reselection when a selected cell is not a conditional reconfiguration candidate cell; or step 705: attempting conditional reconfiguration execution.

In this way, when a radio link failure is detected or triggered, prioritizing a conditional reconfiguration candidate cell to select; or, when the selected cell is not a conditional reconfiguration candidate cell, cell reselection is performed; or, directly attempting conditional reconfiguration execution without performing cell selection, which is able to prioritizing a conditional reconfiguration cell to select and/or prioritizing conditional reconfiguration execution to attempt, thereby avoiding significant service interruption and improving system performance and user experiences.

In step 701, the terminal equipment detects or triggers a radio link failure. For example, the terminal equipment considers that a radio link failure (RLF) is detected when one of the following conditions is fulfilled: timer T310 or T312 in a special cell expires; a random access problem indication from an MAC layer is received, while timers T300, T301, T304, T311 and T319 are not running; an indication that a maximum number of times of retransmission has been reached from an RLC layer is received; a BAP entity receives a backhaul (BH) radio link failure indication if it is connected as an IAB node; and a consistent uplink LBT failure indication from the MAC layer is received, while timer T304 is not running.

In the embodiment of this disclosure, after step 701, any one of steps 702, 703-704 and 705 may be executed. Steps 702, 703-704 and 705 shall be respectively described below in details.

In the embodiment of this disclosure, the conditional reconfiguration may include conditional handover (CHO) and/or conditional PSCell change.

In the embodiment of this disclosure, the conditional reconfiguration candidate cell may include a conditional handover (CHO) candidate cell and/or a conditional PSCell change candidate cell.

For example, the conditional reconfiguration candidate cell includes a conditional handover candidate cell, that is, a cell whose reconfigurationWithSync is included in masterCellGroup of a variable VarConditionalReconfig, and/or, a conditional PSCell change cell, that is, a cell whose reconfigurationWithSync is included in secondaryCellGroup of a variable VarConditionalReconfig.

In the embodiment of this disclosure, the conditional reconfiguration execution may include applying corresponding stored configuration, which may be corresponding configuration of a stored conditional handover (CHO) candidate cell or a conditional PSCell change candidate cell.

In step 702, in a process of cell selection, prioritizing the conditional reconfiguration candidate cell to select.

Figure 8:
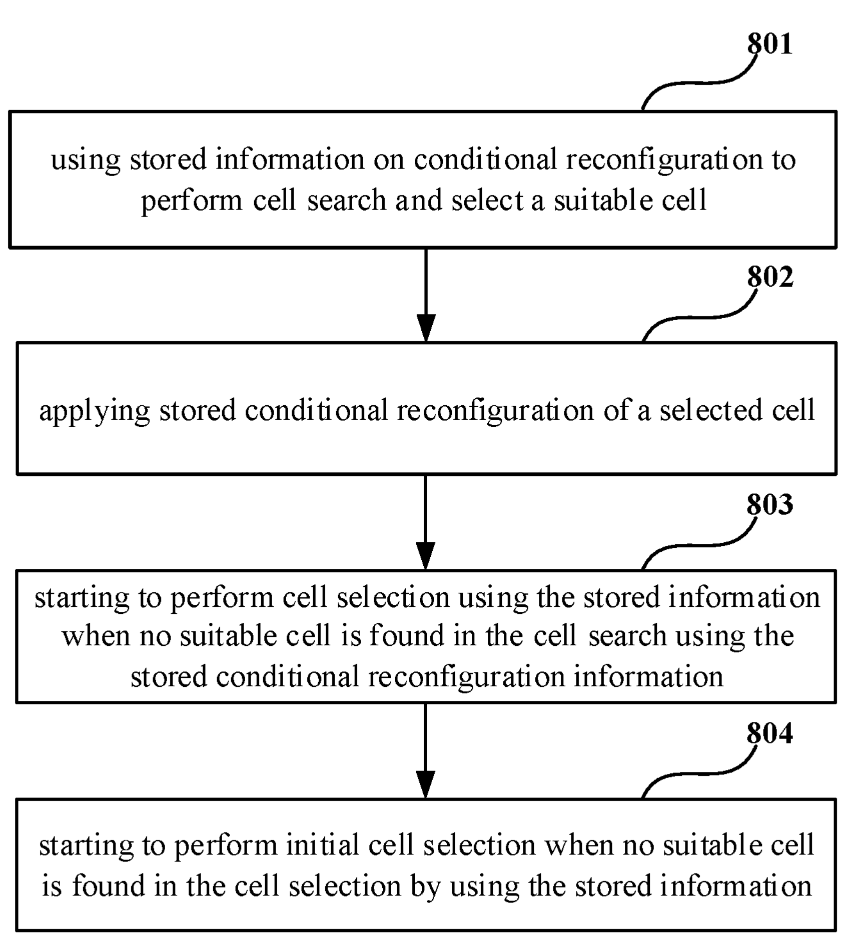
FIG. 8 is a schematic diagram of a method for executing step 702 of Embodiment 1 of this disclosure.

FIG. 8 is a schematic diagram of a method for executing step 702 of Embodiment 1 of this disclosure. As shown in FIG. 8, the method includes:

step 801: using stored information on conditional reconfiguration to perform cell search and select a suitable cell; and step 802: applying stored conditional reconfiguration of a selected cell.

In the embodiment of this disclosure, the stored information on conditional reconfiguration may include at least one of configuration information for attempting conditional reconfiguration execution after the radio link failure and information on a reconfiguration candidate cell. In addition, the stored information on conditional reconfiguration may further include information on a previously received conditional reconfiguration candidate cell.

A method for executing step 801 shall be described below in detail.

Figure 9:
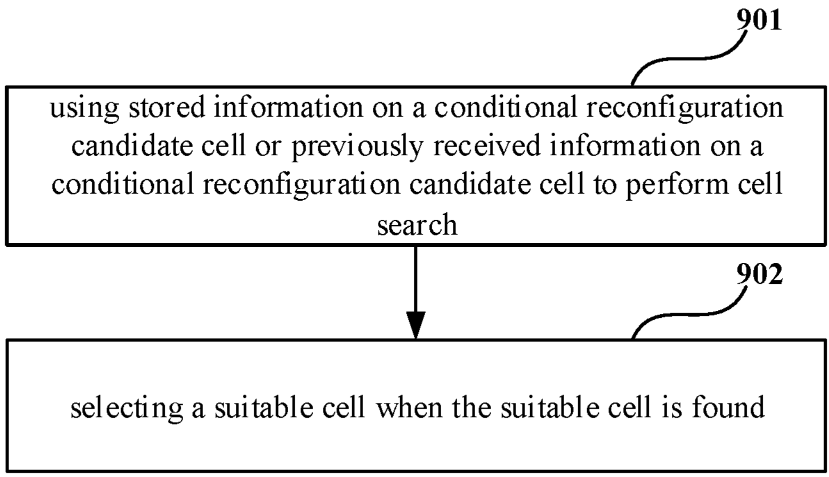
FIG. 9 is a schematic diagram of a method for executing step 801 of Embodiment 1 of this disclosure.

FIG. 9 is a schematic diagram of the method for executing step 801 of Embodiment 1 of this disclosure. As shown in FIG. 9, the method includes:

step 901: using stored information on a conditional reconfiguration candidate cell or previously received information on a conditional reconfiguration candidate cell to perform cell search; and step 902: selecting a suitable cell when the suitable cell is found.

In step 901, for example, the using stored information on a conditional reconfiguration candidate cell or previously received information on a conditional reconfiguration candidate cell to perform cell search includes: when a network device configured the terminal equipment to try conditional reconfiguration execution after a radio link failure and the terminal equipment stores the information on a conditional reconfiguration candidate cell or the terminal equipment previously received information on a conditional reconfiguration candidate cell, performing cell search by using the stored information on a conditional reconfiguration candidate cell or previously received information on a conditional reconfiguration candidate cell.

In the embodiment of this disclosure, for example, when the network configures attemptCondReconfig, it is considered that the network configures that terminal equipment attempts conditional reconfiguration execution after the radio link failure.

In step 901, for example, the cell search is performed at a frequency of the conditional reconfiguration candidate cell. For another example, if the conditional reconfiguration candidate cell is a CHO candidate cell, the cell search is performed at a frequency of the CHO candidate cell.

In the embodiment of this disclosure, for a cell, if its reconfigurationWithSync is included in masterCellGroup of the variable VarConditionalReconfig, the cell is a CHO candidate cell.

In step 902, when a suitable cell is found, the suitable cell is selected. As a result, the selected cell is a conditional reconfiguration candidate cell as the information on the conditional reconfiguration candidate cell is used for the cell search.

In step 902, during the process of cell search, determining whether a suitable cell is found is, for example, selecting a cell of good quality. For example, whether it is a suitable cell is determined based on an S criterion.

The implementation of step 801 is explained above. In step 801, a suitable cell is selected.

In step 802, the stored conditional reconfiguration corresponding to the selected cell is applied on the selected cell.

In the embodiment of this disclosure, as shown in FIG. 8, the method may further include:

step 803: starting to perform cell selection using the stored information when no suitable cell is found in the cell search using the stored conditional reconfiguration information.

That is, for example, when all conditional reconfiguration candidate cells do not comply with the S criterion, it is considered that no suitable cell is found, in which case cell selection using the stored information is started.

Figure 10:
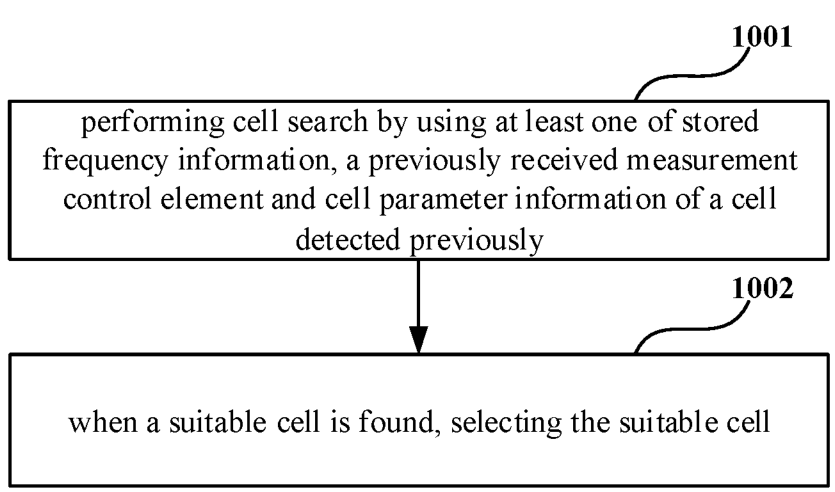
FIG. 10 is a schematic diagram of a method of cell selection by using stored information of Embodiment 1 of this disclosure.

FIG. 10 is a schematic diagram of a method of cell selection by using the stored information of Embodiment 1 of this disclosure. As shown in FIG. 10, the method includes:

step 1001: performing cell search by using at least one of stored frequency information, a previously received measurement control element and cell parameter information of a cell detected previously; and step 1002: when a suitable cell is found, selecting the suitable cell.

In step 1001, for example, a cell search is performed on the stored frequency and the frequency of the detected cell.

In step 1001, during the process of cell search, determining whether a suitable cell is found is, for example, selecting a cell of good quality. For example, whether it is a suitable cell is determined based on the S criterion.

In step 1002, during the process of cell search, when a suitable cell is found, the suitable cell is selected.

As shown in FIG. 8, the method may further include:

step 804: starting to perform initial cell selection when no suitable cell is found in the cell selection by using the stored information.

Figure 11:
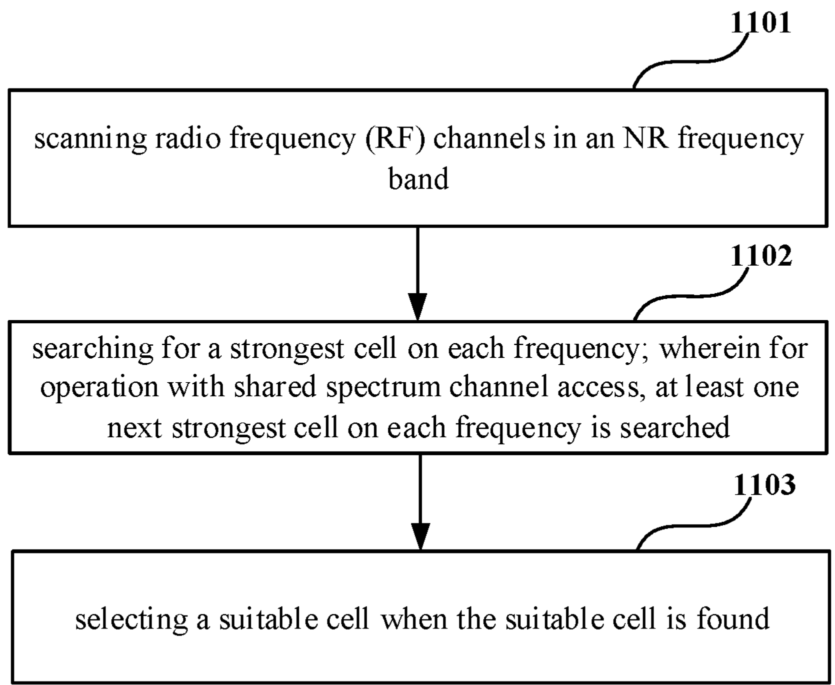
FIG. 11 is a schematic diagram of a method of initial cell selection of Embodiment 1 of this disclosure.

FIG. 11 is a schematic diagram of a method of initial cell selection of Embodiment 1 of this disclosure. As shown in FIG. 11, the method includes:

step 1101: scanning radio frequency (RF) channels in an NR frequency band;

step 1102: searching for a strongest cell on each frequency; wherein for operation with shared spectrum channel access, at least one next strongest cell on each frequency is searched; and step 1103: selecting a suitable cell when the suitable cell is found.

In step 1101, the terminal equipment scans the radio frequency channels in the NR frequency band, for example, the terminal equipment scans all RF channels in the NR frequency band according to its capabilities to find a suitable cell.

In the process of cell search in step 1102, the strongest cell is searched at each frequency, wherein for the operation of shared spectrum channel access, at least one next strongest cell on each frequency is searched.

In the embodiment of this disclosure, cells are ordered according to their quality, wherein a cell of best quality is the strongest cell, and at least one cell after the strongest cell is at least one next strongest cell.

In step 1103, for example, whether a cell is a suitable cell is determined based on the S criterion.

Figure 12:
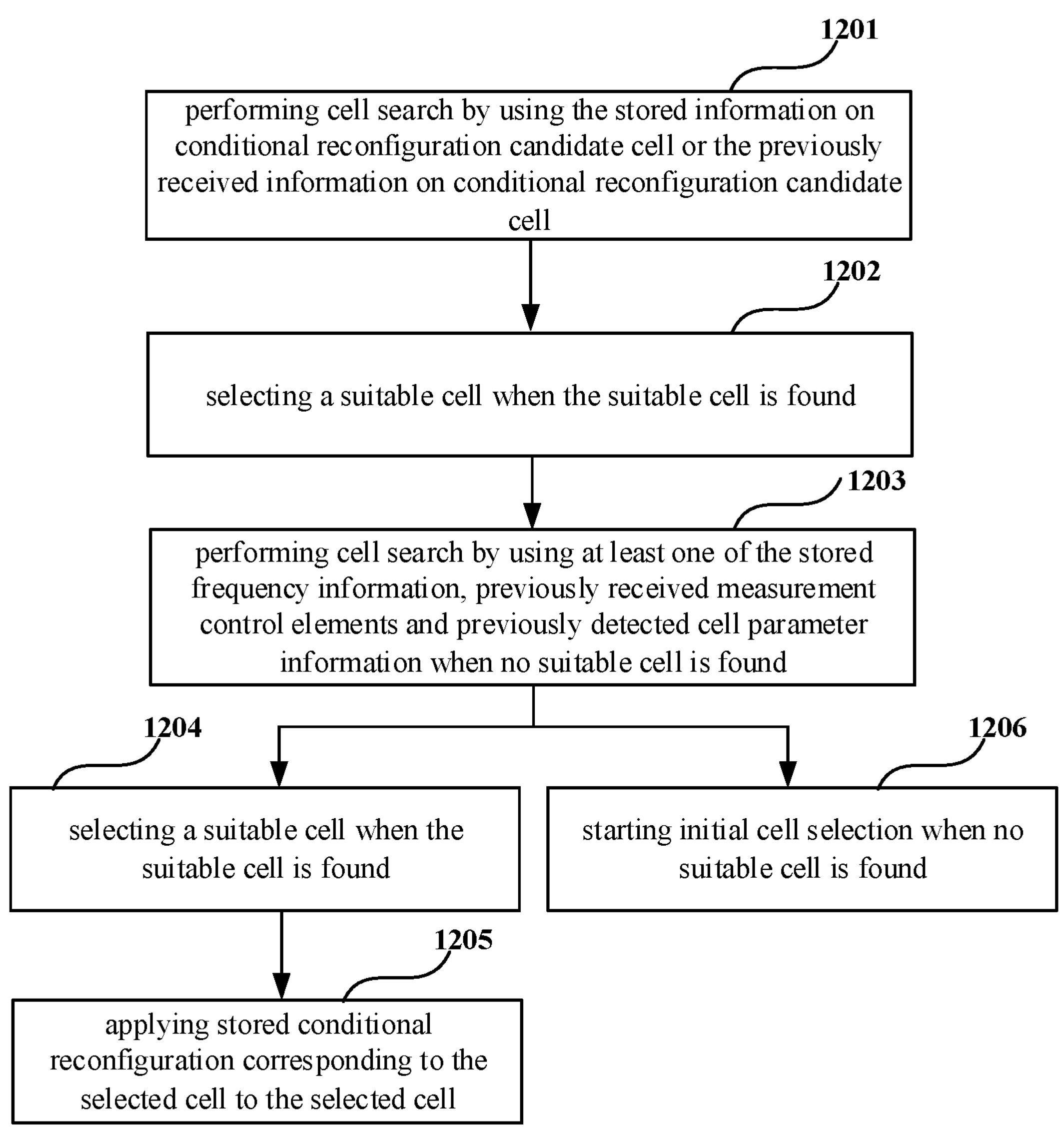
FIG. 12 is another schematic diagram of the method for executing step 702 of Embodiment 1 of this disclosure.

As shown in FIG. 8, in step 803, when no suitable cell is found, cell selection using the stored information is started. Or, it may also be that when no suitable cell is found, steps in FIG. 10 are executed directly. For example, FIG. 12 is another schematic diagram of the method for executing step 702 of Embodiment 1 of this disclosure. As shown in FIG. 12, the method includes:

step 1201: performing cell search by using the stored information on conditional reconfiguration candidate cell or the previously received information on conditional reconfiguration candidate cell;

step 1202: selecting a suitable cell when the suitable cell is found;

step 1203: performing cell search by using at least one of the stored frequency information, previously received measurement control elements and previously detected cell parameter information when no suitable cell is found;

step 1204: selecting a suitable cell when the suitable cell is found;

step 1205: applying stored conditional reconfiguration corresponding to the selected cell to the selected cell; and step 1206: starting initial cell selection when no suitable cell is found.

In step 1206, a started method of initial cell selection may be identical to the method shown in FIG. 11, and specific steps thereof are shown in FIG. 11, which shall not be repeated herein any further.

Figure 13:
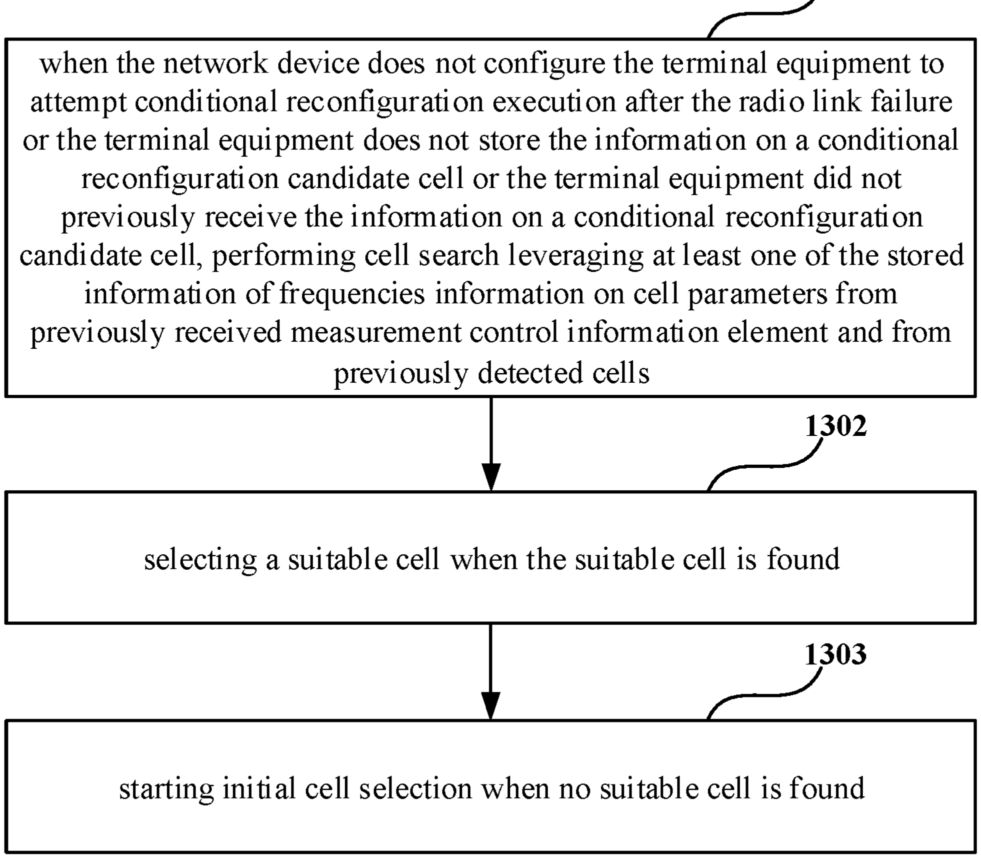
FIG. 13 is another schematic diagram of the method for executing step 801 of Embodiment 1 of this disclosure.

FIG. 13 is another schematic diagram of the method for executing step 801 of Embodiment 1 of this disclosure. As shown in FIG. 13, the method includes:

step 1301: when the network device does not configure the terminal equipment to attempt conditional reconfiguration execution after the radio link failure or the terminal equipment does not store the information on a conditional reconfiguration candidate cell or the terminal equipment did not previously receive the information on a conditional reconfiguration candidate cell, performing cell search leveraging at least one of the stored information of frequencies information on cell parameters from previously received measurement control information element and from previously detected cells; and step 1302: selecting a suitable cell when the suitable cell is found.

In step 1301, when the network device does not configure the terminal equipment to attempt conditional reconfiguration execution after the radio link failure or the terminal equipment does not store the information on a conditional reconfiguration candidate cell or the terminal equipment did not previously receive the information on a conditional reconfiguration candidate cell, cell search is performed leveraging at least one of the stored information of frequencies information on cell parameters from previously received measurement control information element and from previously detected cells, that is, when one of three conditions is fulfilled, the cell search is performed leveraging at least one of the stored information of frequencies information on cell parameters from previously received measurement control information element and from previously detected cells, and these three conditions are that the network device does not configure the terminal equipment to attempt conditional reconfiguration execution after the radio link failure, the terminal equipment does not store the information on a conditional reconfiguration candidate cell, and the terminal equipment did not previously receive the information on a conditional reconfiguration candidate cell.

In other words, when any two of the above three conditions are fulfilled, the cell search is performed leveraging at least one of the stored information of frequencies information on cell parameters from previously received measurement control information element and from previously detected cells; or, it may be also that when any one of the above three conditions are fulfilled, the cell search is performed leveraging at least one of the stored information of frequencies information on cell parameters from previously received measurement control information element and from previously detected cells.

For example, when the network does not configure the terminal equipment to attempt conditional reconfiguration execution after the radio link failure or the terminal equipment does not store the information on a conditional reconfiguration candidate cell, the cell search is performed leveraging at least one of the stored information of frequencies information on cell parameters from previously received measurement control information element and from previously detected cells;

for another example, when the terminal equipment does not store the information on a conditional reconfiguration candidate cell, the cell search is performed leveraging at least one of the stored information of frequencies information on cell parameters from previously received measurement control information element and from previously detected cells.

In step 1301, the cell search is performed leveraging at least one of the stored information of frequencies information on cell parameters from previously received measurement control information element and from previously detected cells, for example, the cell search is performed on the stored frequency and a frequency of the detected cell.

In step 1301, during the process of cell search, determining whether a suitable cell is found is, for example, selecting a cell of good quality. For example, whether it is a suitable cell is determined based on the S criterion.

In step 1302, during the process of cell search, when a suitable cell is found, the suitable cell is selected.

As shown in FIG. 13, the method may further include:

step 1303: starting initial cell selection when no suitable cell is found.

In the embodiment of this disclosure, when the network does not configure the terminal equipment to attempt conditional reconfiguration execution after the radio link failure or the terminal equipment does not store the information on a conditional reconfiguration candidate cell, the cell search is performed leveraging at least one of the stored information of frequencies information on cell parameters from previously received measurement control information element and from previously detected cells; when a suitable cell is found, the cell is selected; and when no suitable cell is found, it may be said that a suitable cell is not found and selected.

Figure 14:
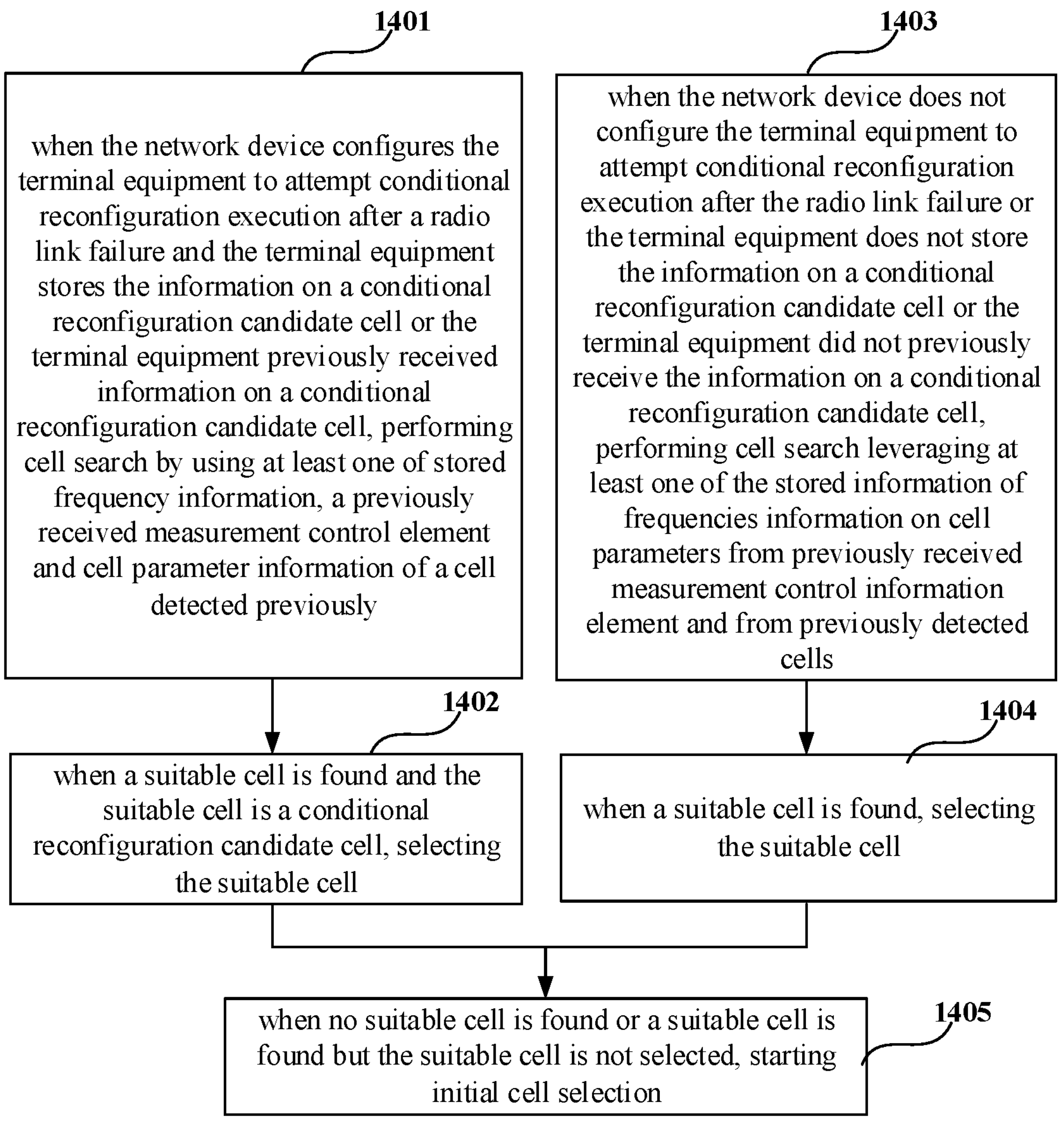
FIG. 14 is a further schematic diagram of the method for executing step 801 of Embodiment 1 of this disclosure.

FIG. 14 is a further schematic diagram of the method for executing step 801 of Embodiment 1 of this disclosure. As shown in FIG. 14, the method includes:

step 1401: when the network device configures the terminal equipment to attempt conditional reconfiguration execution after a radio link failure and the terminal equipment stores the information on a conditional reconfiguration candidate cell or the terminal equipment previously received information on a conditional reconfiguration candidate cell, performing cell search by using at least one of stored frequency information, a previously received measurement control element and cell parameter information of a cell detected previously;

step 1402: when a suitable cell is found and the suitable cell is a conditional reconfiguration candidate cell, selecting the suitable cell;

step 1403: when the network device does not configure the terminal equipment to attempt conditional reconfiguration execution after the radio link failure or the terminal equipment does not store the information on a conditional reconfiguration candidate cell or the terminal equipment did not previously receive the information on a conditional reconfiguration candidate cell, performing cell search leveraging at least one of the stored information of frequencies information on cell parameters from previously received measurement control information element and from previously detected cells; and step 1404: when a suitable cell is found, selecting the suitable cell.

In step 1401, for example, the cell search is performed on the stored frequency and the frequency of the detected cell.

In step 1401, during the process of cell search, determining whether a suitable cell is found is, for example, selecting a cell of good quality. For example, whether it is a suitable cell is determined based on the S criterion.

In step 1402, during the process of cell search, when a suitable cell is found and the suitable cell is a conditional reconfiguration candidate cell, the suitable cell is selected.

Steps 1403 and 1404 are identical to steps 1301 and 1302, and shall not be repeated herein any further.

As shown in FIG. 14, the method may further include:

step 1405: when no suitable cell is found or a suitable cell is found but the suitable cell is not selected, starting initial cell selection.

In the embodiment of this disclosure, in step 1401, the cell search is performed leveraging at least one of the stored information of frequencies information on cell parameters from previously received measurement control information element and from previously detected cells, and when a suitable cell is found and the suitable cell is a conditional reconfiguration candidate cell, the suitable cell is selected;

and when no suitable cell is found, initial cell selection is started; or, if a suitable cell is found but the cell is not a conditional reconfiguration candidate cell, the cell is not selected, that is, initial cell selection is started when a suitable cell is found but the suitable cell is not selected. Therefore, in step 1405, it may also be that when no suitable cell is found and selected, initial cell selection is started.

Figure 15:
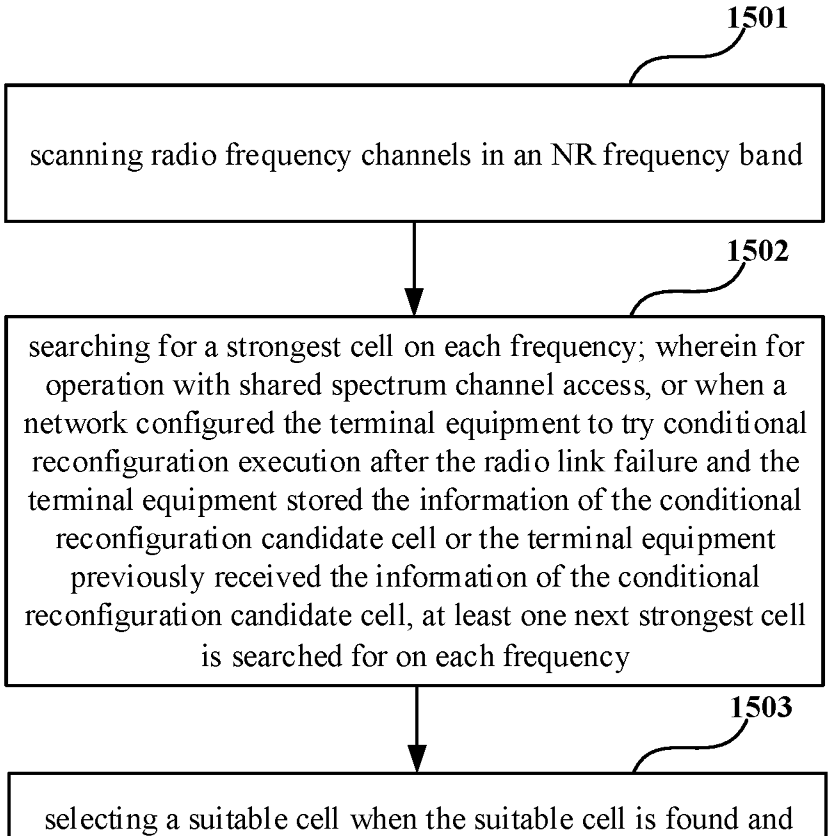
FIG. 15 is a schematic diagram of a method of initial cell selection started in executing step 1305 or step 1405 of Embodiment 1 of this disclosure.

FIG. 15 is a schematic diagram of a method of initial cell selection started in executing step 1305 or step 1405 of Embodiment 1 of this disclosure. As shown in FIG. 15, the method includes:

step 1501: scanning radio frequency channels in an NR frequency band;

step 1502: searching for a strongest cell on each frequency; wherein for operation with shared spectrum channel access, or when a network configured the terminal equipment to try conditional reconfiguration execution after the radio link failure and the terminal equipment stored the information of the conditional reconfiguration candidate cell or the terminal equipment previously received the information of the conditional reconfiguration candidate cell, at least one next strongest cell is searched for on each frequency; and step 1503: selecting a suitable cell when the suitable cell is found and the suitable cell is a conditional reconfiguration candidate cell.

In step 1501, the terminal equipment scans the RF channels in the NR frequency band, for example, the terminal equipment scans all RF channels in the NR frequency band according to its capabilities, so as to find a suitable cell.

In the process of cell search in step 1502, the strongest cell is searched for on each frequency, wherein for operation with shared spectrum channel access, or when the network configured the terminal equipment to try conditional reconfiguration execution after a radio link failure and the terminal equipment stores the information on a conditional reconfiguration candidate cell or the terminal equipment received information on the conditional reconfiguration candidate cell before, at least one next strongest cell is further searched for on each frequency.

In the embodiment of this disclosure, cells are ordered according to their quality, wherein a cell of best quality is the strongest cell, and at least one cell after the strongest cell is at least one next strongest cell.

In step 1502, when the network configured the terminal equipment to try conditional reconfiguration execution after a radio link failure and the terminal equipment stores the information on a conditional reconfiguration candidate cell or the terminal equipment previously received information on a conditional reconfiguration candidate cell, the number of strongest cells and next strongest cells searched on each frequency is N, N being greater than 1.

In the embodiment of this disclosure, N is determined based on implementation, or is configured by the network, or is specified in standards.

In step 1503, for example, whether a cell is a suitable cell is determined based on the S criterion.

Figure 16:
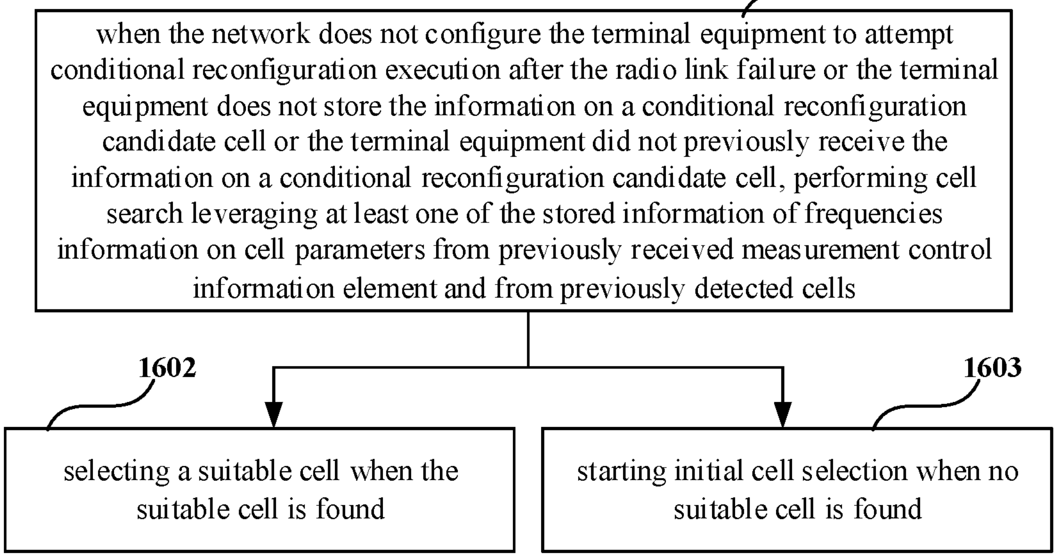
FIG. 16 is still another schematic diagram of the method for executing step 801 of Embodiment 1 of this disclosure.

FIG. 16 is still another schematic diagram of the method for executing step 801 of Embodiment 1 of this disclosure. As shown in FIG. 16, the method includes:

step 1601: when the network does not configure the terminal equipment to attempt conditional reconfiguration execution after the radio link failure or the terminal equipment does not store the information on a conditional reconfiguration candidate cell or the terminal equipment did not previously receive the information on a conditional reconfiguration candidate cell, performing cell search leveraging at least one of the stored information of frequencies information on cell parameters from previously received measurement control information element and from previously detected cells;

step 1602: selecting a suitable cell when the suitable cell is found; and step 1603: starting initial cell selection when no suitable cell is found.

Steps 1601 and 1602 are identical to steps 1301 and 1302, and shall not be repeated herein any further.

Figure 17:
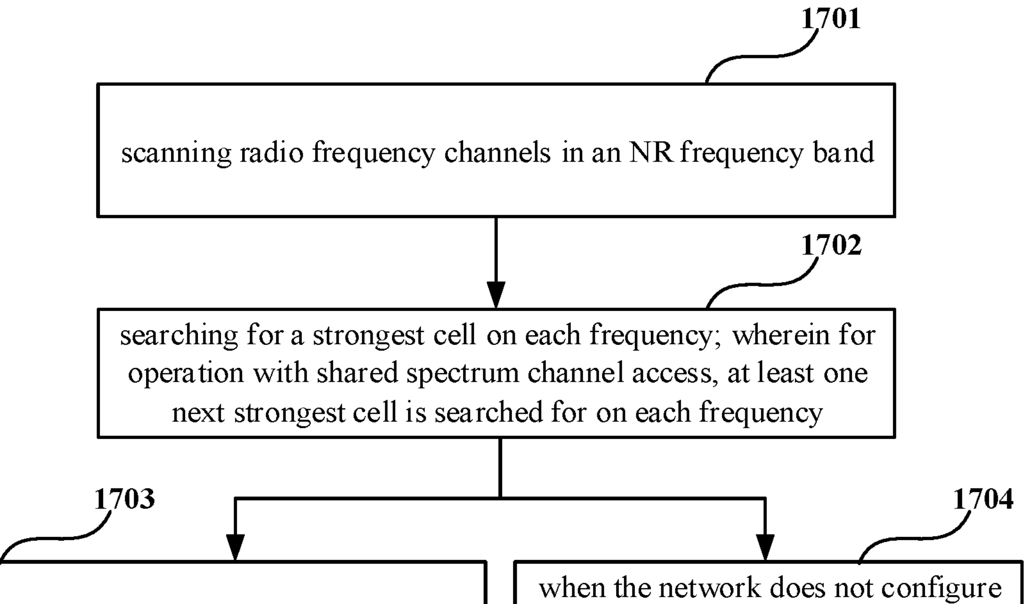
FIG. 17 is a schematic diagram of a method of initial cell selection started in executing step 1603 of Embodiment 1 of this disclosure.

FIG. 17 is a schematic diagram of a method of initial cell selection started in executing step 1603 of Embodiment 1 of this disclosure. As shown in FIG. 17, the method includes:

step 1701: scanning radio frequency channels in an NR frequency band;

step 1702: searching for a strongest cell on each frequency; wherein for operation with shared spectrum channel access, at least one next strongest cell is searched for on each frequency;

step 1703: when the network configured the terminal equipment to try conditional reconfiguration execution after the radio link failure, the terminal equipment stored the information of the conditional reconfiguration candidate cell or the terminal equipment previously received the information of the conditional reconfiguration candidate cell and a second condition is fulfilled, selecting a suitable cell when the suitable cell is found and the suitable cell is a conditional reconfiguration candidate cell; and step 1704: when the network does not configure the terminal equipment to attempt conditional reconfiguration execution after the radio link failure or the terminal equipment does not store the information on a conditional reconfiguration candidate cell or the terminal equipment did not previously receive the information on a conditional reconfiguration candidate cell, or when the network configured the terminal equipment to try conditional reconfiguration execution after the radio link failure or the terminal equipment stores the information on a conditional reconfiguration candidate cell or the terminal equipment previously received the information on a conditional reconfiguration candidate cell and a first conditional is fulfilled, selecting a suitable cell when the suitable cell is found.

In the embodiment of this disclosure, the first condition may include that a first timer expires, wherein when the terminal equipment scans the RF channels in the NR frequency band, or when the terminal equipment scans the RF channels in the NR frequency band and the first timer is configured, the first timer is started, and the first timer is stopped when a suitable cell is found; or, the terminal equipment has scanned all RF channels in the NR frequency band and all found suitable cells are not conditional reconfiguration candidate cells.

In the embodiment of this disclosure, the second condition may include that the first timer is not configured, or, the first timer is running, or, the first timer is configured and is running, or, the terminal equipment has not yet scanned all RF channels in the NR frequency band; wherein when the terminal equipment scans the RF channels in the NR frequency band, or when the terminal equipment scans the RF channels in the NR frequency band and the first timer is configured, the first timer is started, and when a suitable cell is found, the first timer is stopped.

In the embodiment of this disclosure, application of the stored conditional reconfiguration corresponding to the selected cell may include conditional reconfiguration execution. For example, CHO execution is attempted once on the selected cell.

Figure 18:
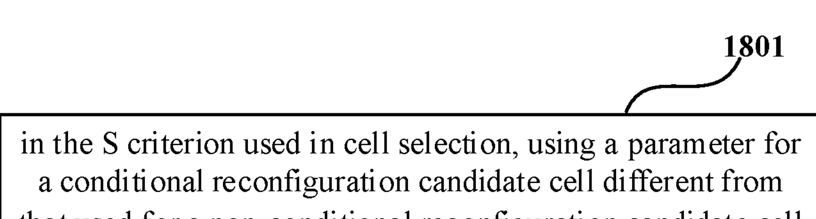
FIG. 18 is a further schematic diagram of the method for executing step 702 of Embodiment 1 of this disclosure.

FIG. 18 is a further schematic diagram of the method for executing step 702 of Embodiment 1 of this disclosure. As shown in FIG. 18, the method includes:

step 1801: in the S criterion used in cell selection, using a parameter for a conditional reconfiguration candidate cell different from that used for a non-conditional reconfiguration candidate cell.

That is, in the S criterion used for cell selection, a specific parameter is used for the conditional reconfiguration candidate cell. The parameter is, for example, a minimum value specific to the conditional reconfiguration candidate cell.

For example, in the S criterion, a threshold or offset different from that used for a non-conditional reconfiguration candidate cell is used for the conditional reconfiguration candidate cell.

That is, in the S criterion, a specific threshold or offset is used for the conditional reconfiguration candidate cell.

For example, in the S criterion, the specific threshold is used for the conditional reconfiguration candidate cell, or a new offset is added to the conditional reconfiguration candidate cell.

In the embodiment of this disclosure, the parameter or threshold or offset may be provided by system information or an RRC dedicated message. For example, the system information is SIB1.

For example, in the system information, a minimum value specific to the CHO candidate cell is provided, such as $Q_{rxlevmin\_CHO}$ and/or $Q_{qualmin\_CHO}$ specific to the CHO candidate cell; and for the CHO candidate cell, the S criterion is updated to the following formulae (1) and (2):

$$S_{rxlev}=Q_{rxlevmeas}-(Q_{rxlevmin\_CHO}+Q_{rxlevminoffset})-P_{compensation}-Q_{offsettemp}-Q_{offset} \quad (1),$$

$$S_{qual}=Q_{qualmeas}-(Q_{qualmin\_CHO}+Q_{qualminoffset})-Q_{offsettemp}-Q_{offset} \quad (2).$$

For a non-CHO candidate cell, a current S criterion may be used or an updated S criterion to use a threshold specific to the non-CHO candidate cell.

For another example, in the system information, an offset specific to the CHO candidate cell is added, such as $Q_{offsetCHO}$ specific to the CHO candidate cell.

In this case, for the CHO candidate cell, the S criterion is updated to the following formulae (3) and (4):

$$S_{rxlev}=Q_{rxlevmeas}-(Q_{rxlevmin}+Q_{rxlevminoffset})-P_{compensation}-Q_{offsettemp}-Q_{offsetCHO} \quad (3),$$

$$S_{qual}=Q_{qualmeas}-(Q_{qualmin}+Q_{qualminoffset})-Q_{offsettemp}-Q_{offsetCHO} \quad (4).$$

Or, for the CHO candidate cell, the S criterion is updated to the following formulae (5) and (6):

$$S_{rxlev}=Q_{rxlevmeas}-(Q_{rxlevmin}+Q_{rxlevminoffset\_CHO})-P_{compensation}-Q_{offsettemp} \quad (5),$$

$$S_{qual}=Q_{qualmeas}-(Q_{qualmin}+Q_{qualminoffset\_CHO})-Q_{offsettemp} \quad (6).$$

In formulae (1)-(6), $S_{rxlev}$ denotes a cell selection RX level value, $S_{qual}$ denotes a cell selection quality value, $Q_{rxlevmeas}$ denotes an RSRP average level value of cell selection RX, $Q_{rxlevmin}$ denotes a minimum level value of cell selection RX, $Q_{rxlevmin\_CHO}$ denotes an RX level minimum value specific to the CHO candidate cell, $Q_{qualmin\_CHO}$ denotes a quality minimum value specific to the CHO candidate cell, $Q_{rxlevminoffset}$ denotes a minimum level offset of cell selection RX, $P_{compensation}$ denotes a compensation value of cell selection RX, $Q_{qualmeas}$ denotes an average quality value of RSRP of cell selection, $Q_{quaimi}$ denotes a minimum quality value of cell selection, $Q_{qualminoffset}$ denotes a minimum quality offset of cell selection, Qoffsettemp denotes a temporary offset, $Q_{offset}$ denotes an offset, and $Q_{offsetCHO}$ denotes an offset specific to the CHO candidate cell.

For the non-CHO candidate cell, the current S criterion may be used or an updated S criterion to use a threshold specific to the non-CHO candidate cell.

Figure 19:
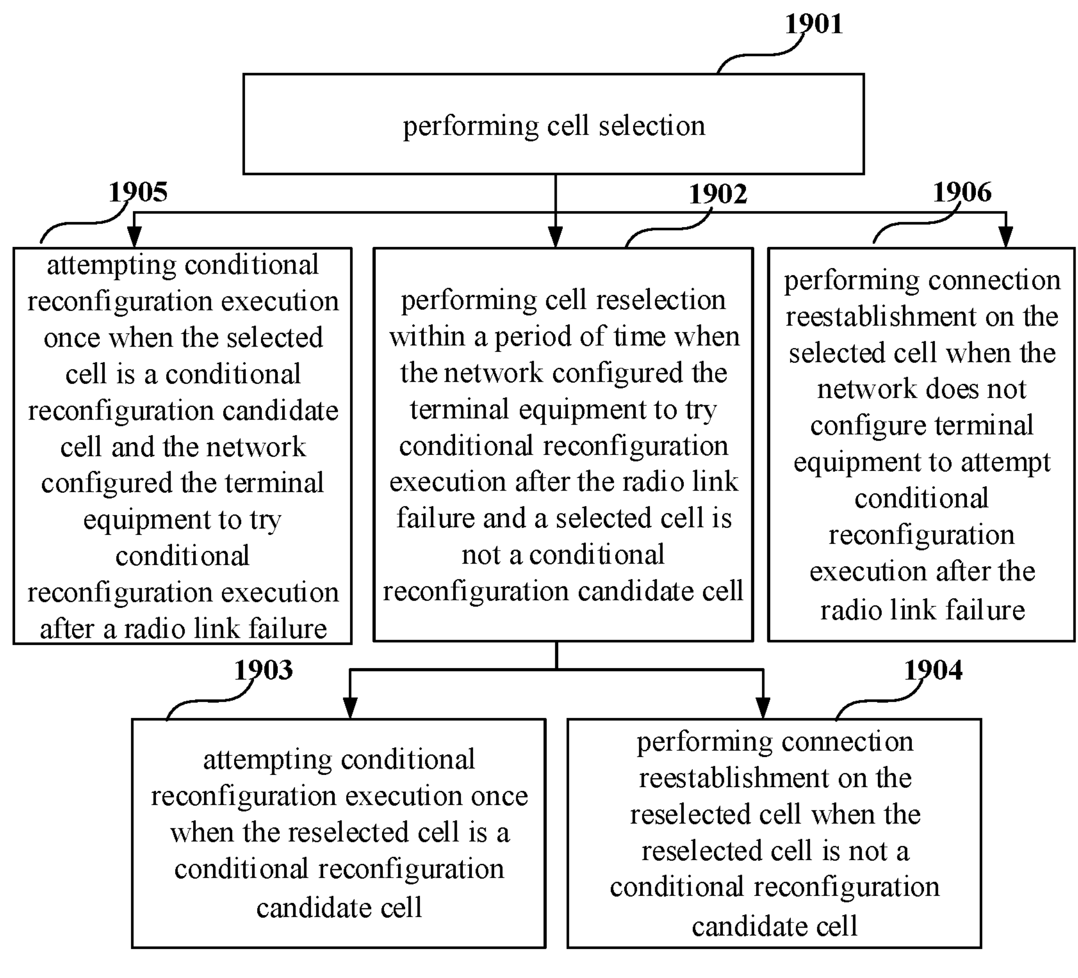
FIG. 19 is a schematic diagram of a method for executing step 703 and step 704 of Embodiment 1 of this disclosure.

FIG. 19 is a schematic diagram of a method for executing step 703 and step 704 of Embodiment 1 of this disclosure. As shown in FIG. 19, the method includes:

step 1901: performing cell selection;

step 1902: performing cell reselection within a period of time when the network configured the terminal equipment to try conditional reconfiguration execution after the radio link failure and a selected cell is not a conditional reconfiguration candidate cell.

In step 1901, an existing method may be used as a method for performing cell selection.

In step 1902, conditions needing to be fulfilled may further be added. For example, when the network configured the terminal equipment to try conditional reconfiguration execution after a radio link failure, the selected cell is not a conditional reconfiguration candidate cell and conditions for cell reselection are fulfilled, cell reselection may be performed within a period of time.

Or, it may also be that as an alternative to step 1902, when the network configured the terminal equipment to try conditional reconfiguration execution after a radio link failure, the selected cell is not a conditional reconfiguration candidate cell and a condition for cell reselection is fulfilled, cell reselection is performed within a period of time.

In the embodiment of this disclosure, timing of the period of time may be performed by a timer T3xx; where, x is a natural number from 0 to 9.

In the embodiment of this disclosure, the condition for the cell reselection may include that it is found that other cells have better quality than the current cell.

As shown in FIG. 19, the method may further include:

step 1903: attempting conditional reconfiguration execution once when the reselected cell is a conditional reconfiguration candidate cell; and step 1904: performing connection reestablishment on the reselected cell when the reselected cell is not a conditional reconfiguration candidate cell.

In the embodiment of this disclosure, in performing cell reselection, prioritizing a conditional reconfiguration candidate cell to select.

For example, the terminal equipment considers that a conditional reconfiguration candidate frequency or a frequency of the conditional reconfiguration candidate cell to be a high priority, or the conditional reconfiguration candidate frequency or a frequency other than the frequency of the conditional reconfiguration candidate cell to be a low priority.

For another example, in an R criterion for ordering intra-frequency cells and inter-frequency cells with identical priorities, an offset different from that used in a non-conditional reconfiguration candidate cell is used for a conditional reconfiguration candidate cell, that is, a specific offset is used for the conditional reconfiguration candidate cell. For example, for the CHO candidate cell, if the offset specific to the CHO candidate cell is used, a neighboring cell order R criterion $R_n=Q_{meas,n}-Q_{offset}-Q_{offsetCHO}$.

As shown in FIG. 19, the method may further include:

step 1905: attempting conditional reconfiguration execution once when the selected cell is a conditional reconfiguration candidate cell and the network configured the terminal equipment to try conditional reconfiguration execution after a radio link failure; and step 1906: performing connection reestablishment on the selected cell when the network does not configure terminal equipment to attempt conditional reconfiguration execution after the radio link failure.

In step 1906, when the network does not configure terminal equipment to attempt conditional reconfiguration execution after the radio link failure, connection reestablishment is performed on the selected cell regardless of whether the selected cell is a conditional reconfiguration candidate cell.

In the embodiment of this disclosure, after a radio link failure occurs, it is also possible to directly attempt conditional reconfiguration execution without performing cell selection.

FIG. 20 is a schematic diagram of a method for executing step 705 of Embodiment 1 of this disclosure. As shown in FIG. 20, the method includes:

step 2001: attempting conditional reconfiguration execution once when AS security has been activated and an SRB2 and at least one DRB have been setup, or, for an IAB, when AS security has been activated and an SRB2 has been setup, and when a timer T316 is not configured or SCG transmission is suspended or PSCell change is ongoing, a third condition is fulfilled for a conditional reconfiguration candidate cell and the network configured the terminal equipment to try conditional reconfiguration execution or other similar behaviors after the radio link failure.

In the embodiment of this disclosure, the third condition may include that:

for a conditional reconfiguration candidate cell, $S_{rxlev}>0$ and/or $S_{qual}>0$; or, quality of the conditional reconfiguration candidate cell is better than a first threshold; or, for a case where dual-connectivity is configured, when a radio link failure of a master cell group is detected, the quality of the conditional reconfiguration candidate cell is better than that of a PSCell or the quality of the conditional reconfiguration candidate cell is offset better than the PSCell; and when a radio link failure of a secondary cell group is detected, the quality of the conditional reconfiguration candidate cell is better than quality of a secondary cell of a secondary cell group or the quality of the conditional reconfiguration candidate cell is offset better than the secondary cell of the secondary cell group.

Wherein, $S_{rxlev}$ and $S_{qual}$ may be calculated according to the following formulae (7) and (8):

$$S_{rxlev}=Q_{rxlevmeas}-(Q_{rxlevmin}+Q_{rxlevminoffset})-P_{compensation}-Q_{offsettemp} \quad (7),$$

$$S_{qual}=Q_{qualmeas}-(Q_{qualmin}+Q_{qualminoffset})-Q_{offsettemp} \quad (8);$$

where, $S_{rxlev}$ denotes a cell selection RX level value, $S_{qual}$ denotes a cell selection quality value, $Q_{rxlevmeas}$ denotes an RSRP average level value of cell selection RX, $Q_{rxlevmin}$ denotes a minimum level value of cell selection RX, $Q_{rxlevminoffset}$ denotes a minimum level offset of cell selection RX, $P_{compensation}$ denotes a compensation value of cell selection RX, $Q_{qualmeas}$ denotes an RSRP average quality value of cell selection, $Q_{qualmi}$ denotes a minimum quality value of cell selection, $Q_{qualminoffset}$ denotes a minimum quality offset of cell selection, and $Q_{offsettemp}$ denotes an offset.

In the embodiment of this disclosure, when the third condition is fulfilled for more than one conditional reconfiguration candidate cell, one of the more than one conditional reconfiguration candidate cell may be selected to attempt conditional reconfiguration execution once.

Figure 21:
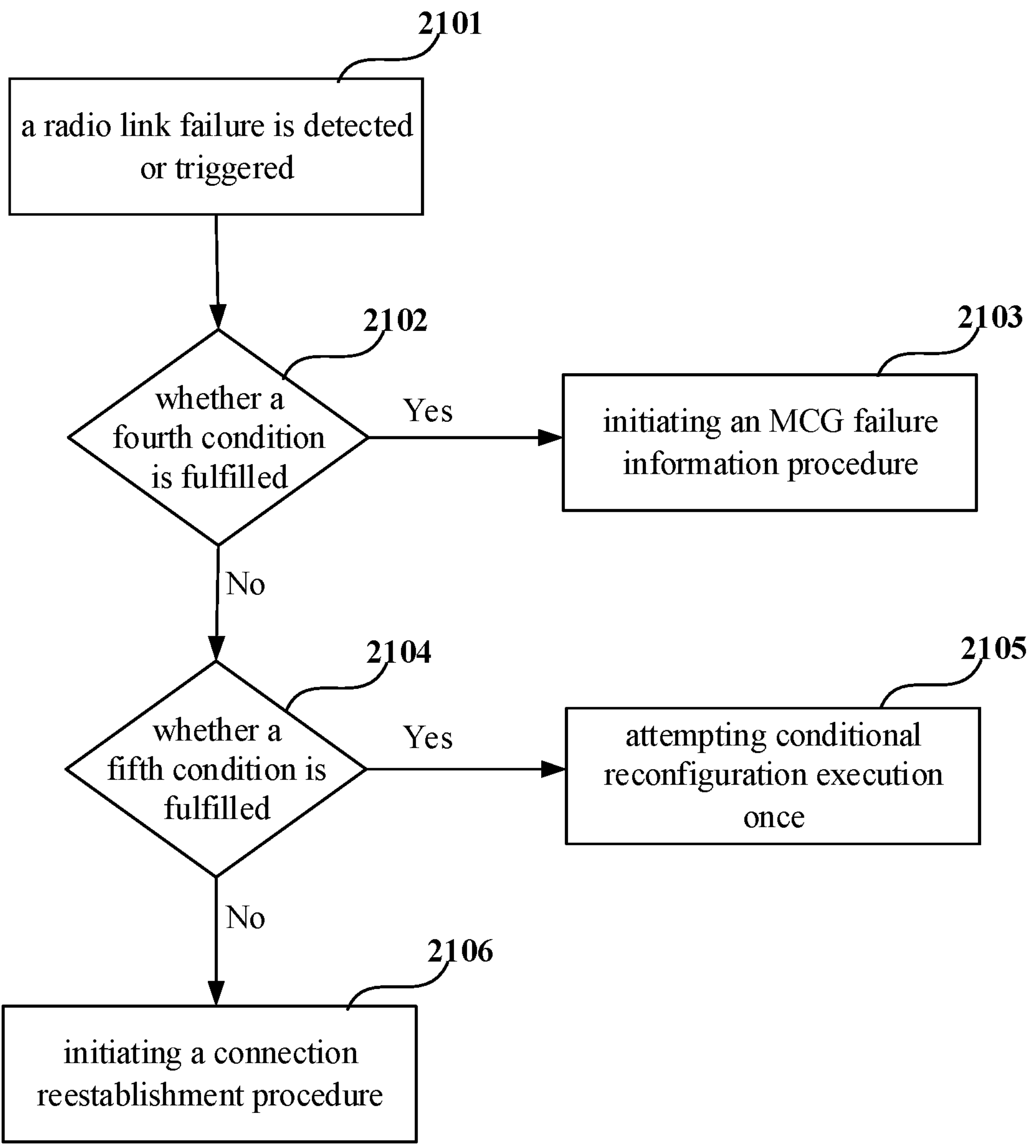
FIG. 21 is a schematic diagram of an example of applying step 705 of Embodiment 1 of this disclosure.

FIG. 21 is a schematic diagram of an example of applying step 705 of Embodiment 1 of this disclosure. As shown in FIG. 21, the method includes:

step 2101: a radio link failure is detected or triggered;

step 2102: it is determined whether a fourth condition is fulfilled, the fourth condition including that AS security has been activated and SRB2 and at least one DRB have been setup, or for IAB, SRB2 has been setup, timer T316 is configured, secondary cell group (SCG) transmission is not suspended and primary secondary cell (PSCell) change is not performed;

when a result of judgment is "yes", entering into step 2103; and when the result of judgment is "no", entering into step 2104;

step 2103: initiating an MCG failure information procedure;

step 2104: it is determined whether a fifth condition is fulfilled, the fifth condition including that AS security has been activated and SRB2 and at least one DRB have been setup, or for IAB, when AS security has been activated and SRB2 has been setup, and when timer T316 is configured, SCG transmission is suspended and PSCell change is performed, a conditional reconfiguration candidate cell fulfills the third condition and the network configured the terminal equipment to try conditional reconfiguration execution or other similar behaviors after a radio link failure;

when a result of judgment is "yes", entering into step 2105; and when the result of judgment is "no", entering into step 2106;

step 2105: attempting conditional reconfiguration execution once; and step 2106: initiating a connection reestablishment procedure.

FIG. 22 is another schematic diagram of executing step 705 of Embodiment 1 of this disclosure. As shown in FIG. 22, the method includes:

step 2201: when AS security has been activated and SRB2 and at least one DRB have been setup, or for IAB, when AS security has been activated and SRB2 has been setup, and when timer T316 is not configured or SCG transmission is suspended and PSCell change is performed, the third condition is fulfilled for more than one conditional reconfiguration candidate cell and the network configured the terminal equipment to try conditional reconfiguration execution or other similar behaviors after a radio link failure, selecting one of the more than one conditional reconfiguration candidate cell and attempting conditional reconfiguration execution once.

In the embodiment of this disclosure, a conditional reconfiguration candidate cell may be selected based on implementation; for example, considering beam conditions and/or UE capabilities, etc., a conditional reconfiguration candidate cell is selected from more than one conditional reconfiguration candidate cell; or, selection is performed according to a rule for cell reselection; for example, a conditional reconfiguration candidate cell on a frequency with a highest priority is selected, wherein when there are more than one conditional reconfiguration candidate cell at the frequency with a highest priority that fulfill the third condition, ranking is performed according to the R criterion, and a conditional reconfiguration candidate cell with a highest Rn value is selected; or, a conditional reconfiguration candidate cell is selected according to an order of occurrences in a configured or stored variable; for example, according to an order of occurrences in configuration VarConditionalReconfig, a conditional reconfiguration candidate cell occurring first in the configuration is selected from more than one conditional reconfiguration candidate cell.

As shown in FIG. 22, the method may further include:

step 2202: performing a behavior of reconfiguration failure when the conditional reconfiguration execution fails; or, step 2203: selecting another conditional reconfiguration candidate cell and attempting conditional reconfiguration execution once when the conditional reconfiguration execution fails.

In step 2203, another conditional reconfiguration candidate cell may be selected and conditional reconfiguration execution may be attempted once, until all or M conditional reconfiguration candidate cells fulfilling the third condition have been attempted, or until timer T3xy expires, wherein timer T3xy is started when attempting conditional reconfiguration execution is started or the radio link fails, x and y are natural numbers from 0 to 9.

In the embodiment of this disclosure, a value of M may be configured by the network, or may be specified in standards, or may be determined based on implementation.

It can be seen from the above embodiment that when a radio link failure is detected or triggered, prioritizing a conditional reconfiguration candidate cell to select; or, when the selected cell is not a conditional reconfiguration candidate cell, cell reselection is performed; or, directly attempting conditional reconfiguration execution without performing cell selection, which is able to prioritizing a conditional reconfiguration cell to select and/or prioritizing conditional reconfiguration execution to attempt, thereby avoiding significant service interruption and improving system performance and user experiences.

Embodiment 2

The embodiment of this disclosure provides a method for processing radio link failures. The method is applicable to a network device and corresponds to the method for processing a radio link failure that is applicable to a terminal equipment in Embodiment 1, with identical contents being not going to be repeated any further.

FIG. 23 is a schematic diagram of the method for processing radio link failures of Embodiment 2 of this disclosure. As shown in FIG. 23, the method includes:

step 2301: configuring a terminal equipment to attempt conditional reconfiguration execution after a radio link fail and/or configuring the terminal equipment with information on a conditional reconfiguration candidate cell.

For example, when the network device configures attemptCondReconfig, it is considered that the network device has configured the terminal equipment to attempt conditional reconfiguration execution after a radio link failure.

In the embodiment of this disclosure, the conditional reconfiguration may include conditional handover (CHO) and/or conditional PSCell change.

In the embodiment of this disclosure, the conditional reconfiguration candidate cell may include a conditional handover (CHO) candidate cell and/or a conditional PSCell change candidate cell.

For example, the conditional reconfiguration candidate cell includes a conditional handover candidate cell, that is, whose reconfigurationWithSync is included in masterCellGroup of a variable VarConditionalReconfig, and/or, a conditional PSCell change cell, that is, whose reconfigurationWithSync is included in se condaryCellGroup of a variable VarConditionalReconfig In the embodiment of this disclosure, the method may further include:

configuring the terminal equipment with a first timer and/or a value of the first timer, wherein when the terminal equipment scans radio frequency channels in an NR frequency band or when the terminal equipment scans radio frequency channels in an NR frequency band and the first timer is configured, the first timer is started, and when a suitable cell is found, the first timer is stopped.

In the embodiment of this disclosure, the method may further include:

configuring the terminal equipment with a parameter or a threshold or an offset used for a conditional reconfiguration candidate cell in an S criterion used in cell selection different from that used for a non-conditional reconfiguration candidate cell.

In the embodiment of this disclosure, the parameter or threshold or offset is provided by system information or an RRC dedicated message.

In the embodiment of this disclosure, the method may further include:

configuring the terminal equipment with the number N of strongest cells and next strongest cells searched for on each frequency.

In the embodiment of this disclosure, the method may further include:

configuring the terminal equipment to select the number M of conditional reconfiguration candidate cells in attempting conditional reconfiguration execution once when the conditional reconfiguration execution fails.

In the embodiment of this disclosure, the method may further include:

configuring the terminal equipment with timer T3xy, wherein timer T3xy is started when attempting conditional reconfiguration execution is started or the radio link fails, x and y are natural numbers from 0 to 9.

In the embodiment of this disclosure, the method may further include:

configuring the terminal equipment with a cell reselection parameter.

For example, the configuring a cell reselection parameter includes: configuring a high priority for a conditional reconfiguration candidate frequency or a frequency of the conditional reconfiguration candidate cell, or configuring a low priority for a conditional reconfiguration candidate frequency or a frequency other than a frequency of the conditional reconfiguration candidate cell.

And/or, the configuring a cell reselection parameter includes: in an R criterion for ranking intra-frequency cells and inter-frequency cells with identical priorities, configuring an offset different from that used in a non-conditional reconfiguration candidate cell is used for a conditional reconfiguration candidate cell.

In the embodiment of this disclosure, reference may be made to Embodiment 1 for specific contents related to the network device, which shall not be described herein any further.

In the embodiment of this disclosure, the network device may also configure an IAB-MT of an IAB-node, and implementation thereof is similar to the configuration of the terminal equipment, which shall not be repeated herein any further.

It can be seen from the above embodiment that network device configures the terminal equipment to attempt conditional reconfiguration execution after the radio link failure and/or information on the conditional reconfiguration candidate cell, so that the terminal equipment is able to perform cell selection based on the configuration. The terminal equipment is able to prioritizing a conditional reconfiguration cell to select and/or prioritizing conditional reconfiguration execution to attempt, thereby avoiding significant service interruption and improving system performance and user experiences.

Embodiment 3

The embodiment of this disclosure provides a method for processing radio link failures. The method is applicable to a network device and a terminal equipment and corresponds to the method for processing a radio link failure that is applicable to a terminal equipment in Embodiment 1 and the method for processing radio link failures applicable to a network device in Embodiment 2, with identical contents being not going to be repeated any further.

Figure 24:
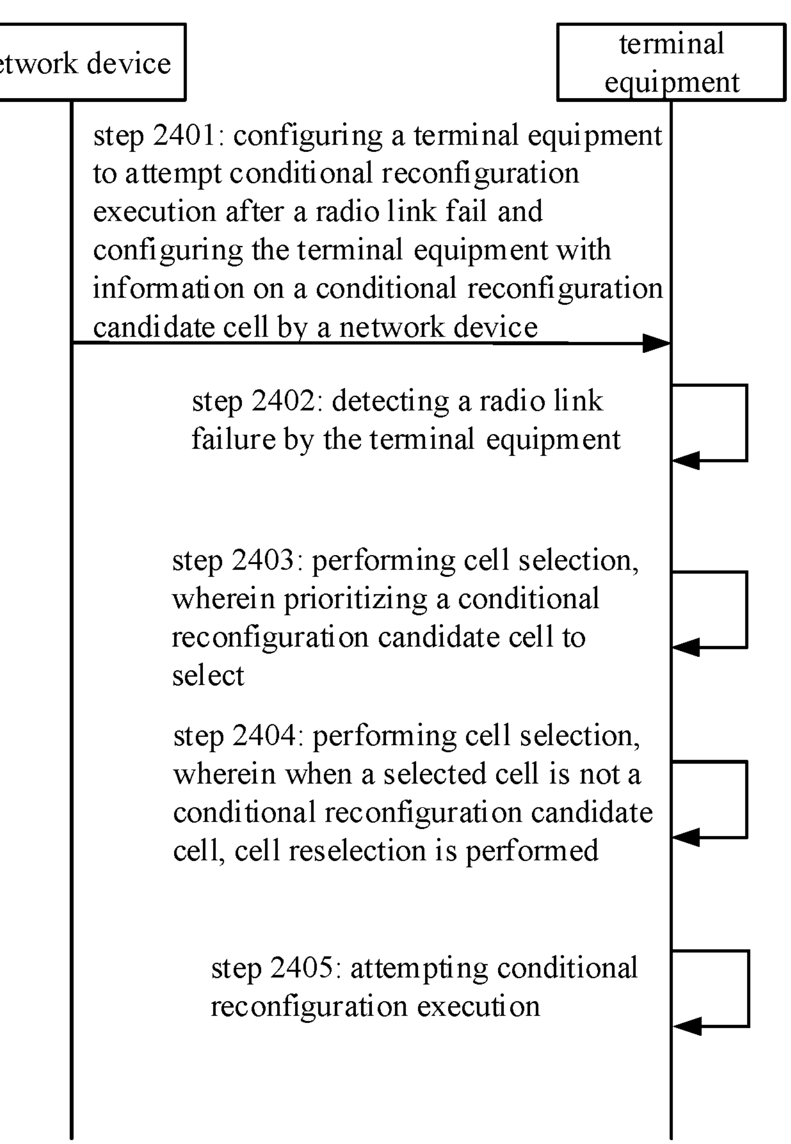
FIG. 24 is a schematic diagram of the method for processing radio link failures of Embodiment 3 of this disclosure.

FIG. 24 is a schematic diagram of the method for processing radio link failures of Embodiment 3 of this disclosure. As shown in FIG. 24, the method includes:

step 2401: configuring a terminal equipment to attempt conditional reconfiguration execution after a radio link fail and configuring the terminal equipment with information on a conditional reconfiguration candidate cell by a network device;

step 2402: detecting a radio link failure by the terminal equipment;

step 2403: performing cell selection, wherein prioritizing a conditional reconfiguration candidate cell to select; or step 2404: performing cell selection, wherein when a selected cell is not a conditional reconfiguration candidate cell, cell reselection is performed; or, step 2405: attempting conditional reconfiguration execution.

In the embodiment of this disclosure, any one of steps 2403-2405 may be executed.

In the embodiment of this disclosure, reference may be made to embodiments 1 and 2 for implementations of steps 2401-2405, which shall not be repeated herein any further.

In the embodiment of this disclosure, the network device may further configure other information, and reference may be made to embodiments 1 and 2 for specific contents, which shall not be repeated herein any further.

It can be seen from the above embodiment that when the terminal equipment detects or triggers a radio link failure, prioritizing a conditional reconfiguration candidate cell to select; or, when the selected cell is not a conditional reconfiguration candidate cell, cell reselection is performed; or, directly attempting conditional reconfiguration execution without performing cell selection, which is able to prioritizing a conditional reconfiguration cell to select and/or prioritizing conditional reconfiguration execution to attempt, thereby avoiding significant service interruption and improving system performance and user experiences.

Embodiment 4

The embodiment of this disclosure provides an apparatus for processing a radio link failure, applicable to a terminal equipment. As a principle of the apparatus for solving problems is similar to that of the method in Embodiment 1, reference may be made to the implementation of the method in Embodiment 1 for implementation of the apparatus, with identical contents being not going to be repeated herein any further.

Figure 25:
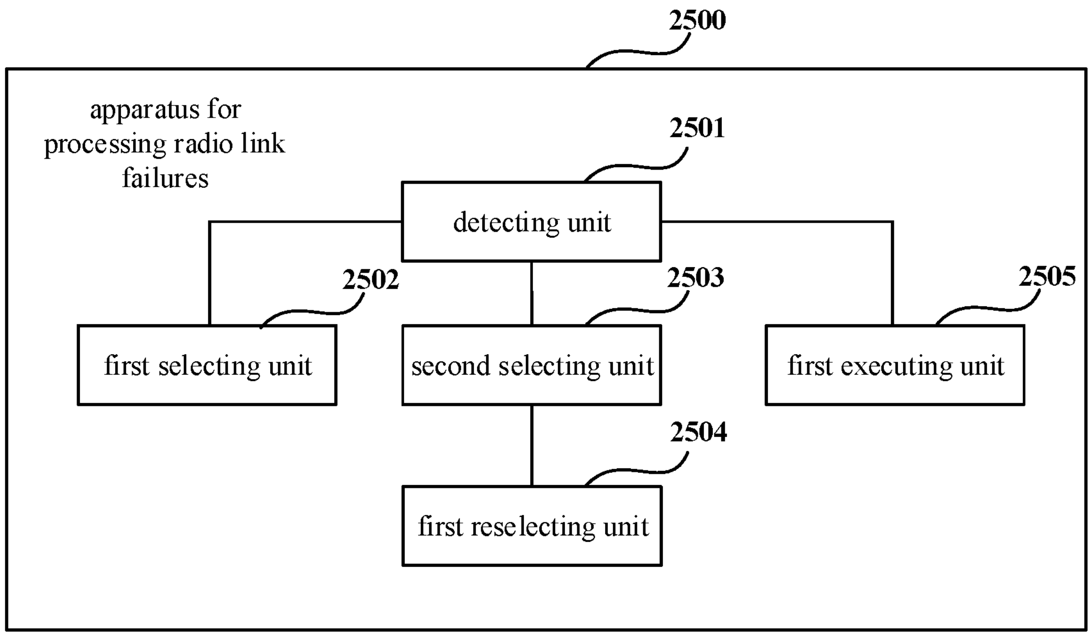
FIG. 25 is a schematic diagram of the apparatus for processing radio link failures of Embodiment 4 of this disclosure.

FIG. 25 is a schematic diagram of the apparatus for processing radio link failures of Embodiment 4 of this disclosure. As shown in FIG. 25, an apparatus 2500 for processing radio link failures includes:

a detecting unit 2501 configured to detect or trigger a radio link failure; and a first selecting unit 2502 configured to perform cell selection, wherein the first selecting unit 2502 prioritizes a conditional reconfiguration candidate cell to select; or a second selecting unit 2503 configured to perform cell selection; and a first reselecting unit 2504 configured to perform cell reselection when a selected cell is not a conditional reconfiguration candidate cell; or a first executing unit 2505 configured to attempt conditional reconfiguration execution.

In the embodiment of this disclosure, the first selecting unit 2502 may include:

a first searching unit configured to leverage stored information on conditional reconfiguration to perform cell search and select a suitable cell; and a first applying unit is used to apply stored conditional reconfiguration of a selected cell.

In the embodiment of this disclosure, the first searching unit may include:

a second searching unit configured to leverage stored information on a conditional reconfiguration candidate cell or previously received information on a conditional reconfiguration candidate cell to perform cell search; and a first selecting unit configured to select a suitable cell when the suitable cell is found.

In the embodiment of this disclosure, the second searching unit is configured to leverage the stored information on a conditional reconfiguration candidate cell or the previously received information on a conditional reconfiguration candidate cell to perform cell search when a network configured the terminal equipment to try conditional reconfiguration execution after the radio link failure, the terminal equipment stored the information of the conditional reconfiguration candidate cell or the terminal equipment previously received the information of the conditional reconfiguration candidate cell.

In the embodiment of this disclosure, the first selecting unit 2502 may further include:

a third searching unit configured to perform cell search leveraging at least one of the stored information of frequencies information on cell parameters from previously received measurement control information element and from previously detected cells when no suitable cell is found; and a second selecting unit configured to select a suitable cell when the suitable cell is found.

In the embodiment of this disclosure, the first selecting unit 2502 may further include:

a first starting unit configured to start a third selecting unit to perform initial cell selection when no suitable cell is found.

In the embodiment of this disclosure, the third selecting unit may include:

a first scanning unit configured to scan radio frequency channels in an NR frequency band;

a fourth searching unit configured to search for a strongest cell on each frequency; wherein for operation with shared spectrum channel access, at least one next strongest cell is searched for on each frequency; and a fourth selecting unit configured to select a suitable cell when the suitable cell is found.

In the embodiment of this disclosure, the first searching unit may include: a fifth searching unit configured to, when a network device configured the terminal equipment to try conditional reconfiguration execution after a radio link failure and the terminal equipment stores the information on a conditional reconfiguration candidate cell or the terminal equipment previously received information on a conditional reconfiguration candidate cell, perform cell search by using at least one of stored frequency information, a previously received measurement control element and cell parameter information of a cell detected previously; and a fifth selecting unit configured to, when a suitable cell is found and the suitable cell is a conditional reconfiguration candidate cell, select the suitable cell.

In the embodiment of this disclosure, the first searching unit may further include:

a sixth searching unit configured to, when the network device does not configure the terminal equipment to attempt conditional reconfiguration execution after the radio link failure or the terminal equipment does not store the information on a conditional reconfiguration candidate cell or the terminal equipment did not previously receive the information on a conditional reconfiguration candidate cell, perform cell search leveraging at least one of the stored information of frequencies information on cell parameters from previously received measurement control information element and from previously detected cells; and a sixth selecting unit configured to, when a suitable cell is found, select the suitable cell.

In the embodiment of this disclosure, the first selecting unit 2502 may further include:

a second starting unit configured to start a seventh selecting unit to perform initial cell selection when no suitable cell is found or when a suitable cell is found but the suitable cell is not selected, the seventh selecting unit including:

a second scanning unit configured to scan radio frequency channels in an NR frequency band;

a seventh searching unit configured to search for a strongest cell on each frequency; wherein for operation with shared spectrum channel access, or when a network configured the terminal equipment to try conditional reconfiguration execution after the radio link failure and the terminal equipment stored the information of the conditional reconfiguration candidate cell or the terminal equipment previously received the information of the conditional reconfiguration candidate cell, the seventh searching unit searches for at least one next strongest cell on each frequency; and an eighth selecting unit configured to select a suitable cell when the suitable cell is found and the suitable cell is a conditional reconfiguration candidate cell.

In the embodiment of this disclosure, when the network configured the terminal equipment to try conditional reconfiguration execution after a radio link failure and the terminal equipment stores the information on a conditional reconfiguration candidate cell or the terminal equipment previously received information on a conditional reconfiguration candidate cell, the number of strongest cells and next strongest cells searched by the seventh searching unit on each frequency is N, N being greater than 1.

In the embodiment of this disclosure, N is determined based on implementation, or is configured by the network, or is specified in standards.

In the embodiment of this disclosure, the first selecting unit 2502 may further include:

a third starting unit configured to start a ninth selecting unit to start initial cell selection when no suitable cell is found, the ninth selecting unit including:

a third scanning unit configured to scan radio frequency channels in an NR frequency band;

an eighth searching unit configured to search for a strongest cell on each frequency, wherein for operation with shared spectrum channel access, it also searches for at least one next strongest cell on each frequency; and a tenth selecting unit configured to select a suitable cell when the network configured the terminal equipment to try conditional reconfiguration execution after the radio link failure, the terminal equipment stored the information of the conditional reconfiguration candidate cell or the terminal equipment previously received the information of the conditional reconfiguration candidate cell, a second condition is fulfilled, the suitable cell is found and the suitable cell is a conditional reconfiguration candidate cell.

In the embodiment of this disclosure, the ninth selecting unit may further include:

an eleventh selecting unit configured to, when the network does not configure the terminal equipment to attempt conditional reconfiguration execution after the radio link failure or the terminal equipment does not store the information on a conditional reconfiguration candidate cell or the terminal equipment did not previously receive the information on a conditional reconfiguration candidate cell, or when the network configured the terminal equipment to try conditional reconfiguration execution after the radio link failure or the terminal equipment stores the information on a conditional reconfiguration candidate cell or the terminal equipment previously received the information on a conditional reconfiguration candidate cell and a first conditional is fulfilled, select a suitable cell when the suitable cell is found.

In the embodiment of this disclosure, the first condition may include that:

a first timer expires, wherein when the terminal equipment scans the RF channels in the NR frequency band, or when the terminal equipment scans the RF channels in the NR frequency band and the first timer is configured, the first timer is started, and the first timer is stopped when a suitable cell is found; or, the terminal equipment has scanned all RF channels in the NR frequency band and all found suitable cells are not conditional reconfiguration candidate cells.

In the embodiment of this disclosure, the second condition may include that:

the first timer is not configured, or, the first timer is running, or, the first timer is configured and is running, or, the terminal equipment has not yet scanned all RF channels in the NR frequency band;

wherein when the terminal equipment scans the RF channels in the NR frequency band, or when the terminal equipment scans the RF channels in the NR frequency band and the first timer is configured, the first timer is started, and when a suitable cell is found, the first timer is stopped.

In the embodiment of this disclosure, the first selecting unit may include:

a twelfth selecting unit configured to, in an S criterion used in cell selection, use a parameter for a conditional reconfiguration candidate cell different from that used for a non-conditional reconfiguration candidate cell.

In the embodiment of this disclosure, in the S criterion, a threshold or offset different from that used for a non-conditional reconfiguration candidate cell is used for the conditional reconfiguration candidate cell.

In the embodiment of this disclosure, the parameter or threshold or offset may be provided by system information or an RRC dedicated message. In the embodiment of this disclosure, the first reselecting unit 2504 is configured to perform cell reselection within a period of time when a network configured the terminal equipment to try conditional reconfiguration execution after the radio link failure and a selected cell is not a conditional reconfiguration candidate cell.

In the embodiment of this disclosure, the first reselecting unit 2504 includes:

a second reselecting unit configured to, when the network configured the terminal equipment to try conditional reconfiguration execution after a radio link failure, the selected cell is not a conditional reconfiguration candidate cell and a condition for cell reselection is fulfilled, perform cell reselection within a period of time.

In the embodiment of this disclosure, the condition for the cell reselection may include that it is found that other cells have better quality than the current cell.

In the embodiment of this disclosure, the apparatus 2500 may further include:

a second executing unit configured to attempt conditional reconfiguration execution once when the reselected cell is a conditional reconfiguration candidate cell.

In the embodiment of this disclosure, the apparatus 2500 may further include:

a first reestablishing unit configured to perform connection reestablishment on the reselected cell when the reselected cell is not a conditional reconfiguration candidate cell.

In the embodiment of this disclosure, prioritizing a conditional reconfiguration candidate cell to select in performing cell selection.

In the embodiment of this disclosure, the terminal equipment considers that conditional reconfiguration candidate frequency or a frequency of the conditional reconfiguration candidate cell to be a high priority, or the conditional reconfiguration candidate frequency or a frequency other than the frequency of the conditional reconfiguration candidate cell to be a low priority.

In the embodiment of this disclosure, in an R criterion for ordering intra-frequency cells and inter-frequency cells with identical priorities, an offset different from that used in a non-conditional reconfiguration candidate cell is used for a conditional reconfiguration candidate cell.

In the embodiment of this disclosure, the apparatus 2500 may further include: a third executing unit configured to attempt conditional reconfiguration execution once when the selected cell is a conditional reconfiguration candidate cell and the network configured the terminal equipment to try conditional reconfiguration execution after a radio link failure.

In the embodiment of this disclosure, the apparatus 2500 may further include:

a second reestablishing unit configured to perform connection reestablishment on the selected cell when the network does not configure terminal equipment to attempt conditional reconfiguration execution after the radio link failure.

In the embodiment of this disclosure, the first executing unit may include:

a fourth executing unit configured to attempt conditional reconfiguration execution once when AS security has been activated and an SRB2 and at least one DRB have been setup, or, for an IAB, when AS security has been activated and an SRB2 has been setup, and when a timer T316 is not configured or SCG transmission is suspended or PSCell change is ongoing, a third condition is fulfilled for a conditional reconfiguration candidate cell and the network configured the terminal equipment to try conditional reconfiguration execution or other similar behaviors after the radio link failure.

In the embodiment of this disclosure, the third condition may include that:

for a conditional reconfiguration candidate cell, $S_{rxlev}>0$ and/or $S_{qual}>0$; where, $S_{rxlev}$ denotes a cell selection RX level value, and $S_{qual}$ denotes a cell selection quality value; or, quality of the conditional reconfiguration candidate cell is better than a first threshold; or, for a case where dual-connectivity is configured, when a radio link failure of a master cell group is detected, the quality of the conditional reconfiguration candidate cell is better than that of a PSCell or the quality of the conditional reconfiguration candidate cell is offset better than the PSCell; and when a radio link failure of a secondary cell group is detected, the quality of the conditional reconfiguration candidate cell is better than quality of a secondary cell of a secondary cell group or the quality of the conditional reconfiguration candidate cell is offset better than the secondary cell of the secondary cell group.

In the embodiment of this disclosure, the first executing unit 2505 may include:

a thirteenth selecting unit configured to, when the third condition is fulfilled for more than one conditional reconfiguration candidate cell, select one of the more than one conditional reconfiguration candidate cell; and a fifth executing unit configured to attempt conditional reconfiguration execution once.

In the embodiment of this disclosure, the thirteenth selecting unit may include:

a fourteenth selecting unit configured to select a conditional reconfiguration candidate cell based on implementation; or a fifteenth selecting unit configured to select a conditional reconfiguration candidate cell on a frequency with a highest priority, wherein when there are more than one conditional reconfiguration candidate cell at the frequency with a highest priority that fulfill the third condition, ranking is performed according to the R criterion, and a conditional reconfiguration candidate cell with a highest Rn value is selected; or a sixteenth selecting unit configured to select a conditional reconfiguration candidate cell according to an order of occurrences in a configured or stored variable In the embodiment of this disclosure, the apparatus 2500 may further include:

a sixth executing unit configured to perform a behavior of reconfiguration failure when the conditional reconfiguration execution fails; or, a seventh executing unit configured to select another conditional reconfiguration candidate cell and attempt conditional reconfiguration execution once.

In the embodiment of this disclosure, the seventh executing unit selects another conditional reconfiguration candidate cell to attempt conditional reconfiguration execution once, until all or M conditional reconfiguration candidate cells fulfilling the third condition have been attempted, or until timer T3xy expires, wherein timer T3xy is started when attempting conditional reconfiguration execution is started or the radio link fails, x and y are natural numbers from 0 to 9.

In the embodiment of this disclosure, M may be configured by the network, or may be specified in standards, or may be determined based on implementation.

In the embodiment of this disclosure, the conditional reconfiguration candidate cell may include a conditional handover (CHO) candidate cell and/or a conditional PSCell change candidate cell.

It can be seen from the above embodiment that when the terminal equipment detects or triggers a radio link failure, prioritizing a conditional reconfiguration candidate cell to select; or, when the selected cell is not a conditional reconfiguration candidate cell, cell reselection is performed; or, directly attempting conditional reconfiguration execution without performing cell selection, which is able to prioritizing a conditional reconfiguration cell to select and/or prioritizing conditional reconfiguration execution to attempt, thereby avoiding significant service interruption and improving system performance and user experiences.

Embodiment 5

The embodiment of this disclosure provides an apparatus for processing radio link failures, applicable to a network device. As a principle of the apparatus for solving problems is similar to that of the method in Embodiment 2, reference may be made to the implementation of the method in Embodiment 2 for implementation of the apparatus, with identical contents being not going to be repeated herein any further.

Figure 26:
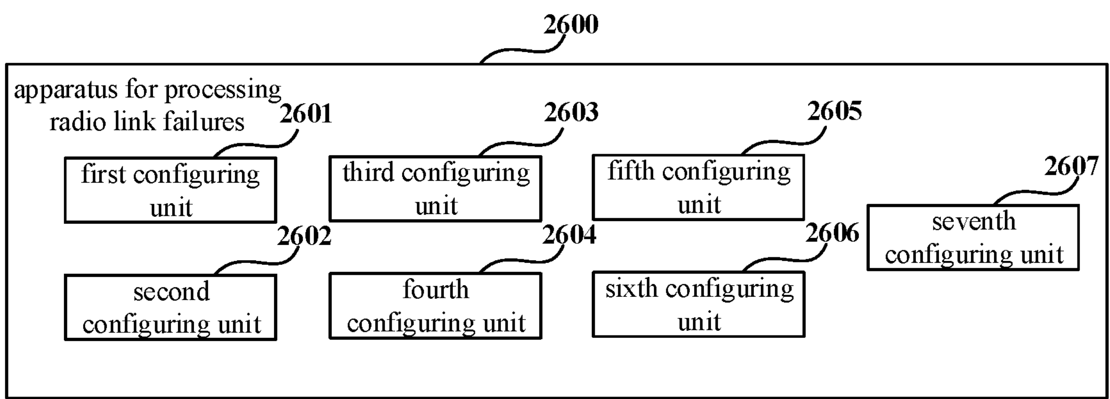
FIG. 26 is a schematic diagram of the apparatus for processing radio link failures of Embodiment 5 of this disclosure.

FIG. 26 is a schematic diagram of the apparatus for processing radio link failures of Embodiment 5 of this disclosure. As shown in FIG. 26, an apparatus 2600 includes:

a first configuring unit 2601 configured to configure a terminal equipment to attempt conditional reconfiguration execution after a radio link fail and/or configure the terminal equipment with information on a conditional reconfiguration candidate cell.

In the embodiment of this disclosure, the first configuring unit 2601 configures the terminal equipment with attemptCondReconfig.

As shown in FIG. 26, the apparatus 2600 may further include:

a second configuring unit 2602 configured to configure the terminal equipment with a first timer and/or a value of the first timer, wherein when the terminal equipment scans radio frequency channels in an NR frequency band or when the terminal equipment scans radio frequency channels in an NR frequency band and the first timer is configured, the first timer is started, and when a suitable cell is found, the first timer is stopped.

As shown in FIG. 26, the apparatus 2600 may further include:

a third configuring unit 2603 configured to configure the terminal equipment with a parameter or a threshold or an offset used for a conditional reconfiguration candidate cell in an S criterion used in cell selection different from that used for a non-conditional reconfiguration candidate cell.

For example, the parameter or threshold or offset is provided by system information or an RRC dedicated message.

As shown in FIG. 26, the apparatus 2600 may further include:

a fourth configuring unit 2604 configured to configure the terminal equipment with the number N of strongest cells and next strongest cells searched on each frequency.

As shown in FIG. 26, the apparatus 2600 may further include:

a fifth configuring unit 2605 configured to configure the terminal equipment with the number M of conditional reconfiguration candidate cells in selecting to attempt conditional reconfiguration execution once when the conditional reconfiguration execution fails.

As shown in FIG. 26, the apparatus 2600 may further include:

a sixth configuring unit 2606 configured to configure the terminal equipment with timer T3xy, wherein timer T3xy is started when attempting conditional reconfiguration execution is started or the radio link fails, x and y are natural numbers from 0 to 9.

As shown in FIG. 26, the apparatus 2600 may further include:

a seventh configuring unit 2607 configured to configure a cell reselection parameter for the terminal equipment.

For example, the configuring cell reselection parameter includes: configuring a high priority for a conditional reconfiguration candidate frequency or a frequency where the conditional reconfiguration candidate cell is located, or configuring a low priority for a frequency other than a conditional reconfiguration candidate frequency or a frequency where the conditional reconfiguration candidate cell is located.

And/or, the configuring cell reselection parameter includes: in an R criterion for ordering intra-frequency cells and inter-frequency cells with identical priorities, configuring an offset different from that used in a non-conditional reconfiguration candidate cell for a conditional reconfiguration candidate cell.

It can be seen from the above embodiment that the network device configures the terminal equipment to attempt conditional reconfiguration execution and/or information on a conditional reconfiguration candidate cell, so that the terminal equipment performs cell selection based on the configuration, and the terminal equipment may prioritizing a conditional reconfiguration cell to select and/or prioritizing conditional reconfiguration execution to attempt, thereby avoiding significant service interruption and improving system performance and user experiences.

Embodiment 6

The embodiment of this disclosure provides a terminal equipment, including the apparatus for processing a radio link failure as described in Embodiment 4.

Figure 27:
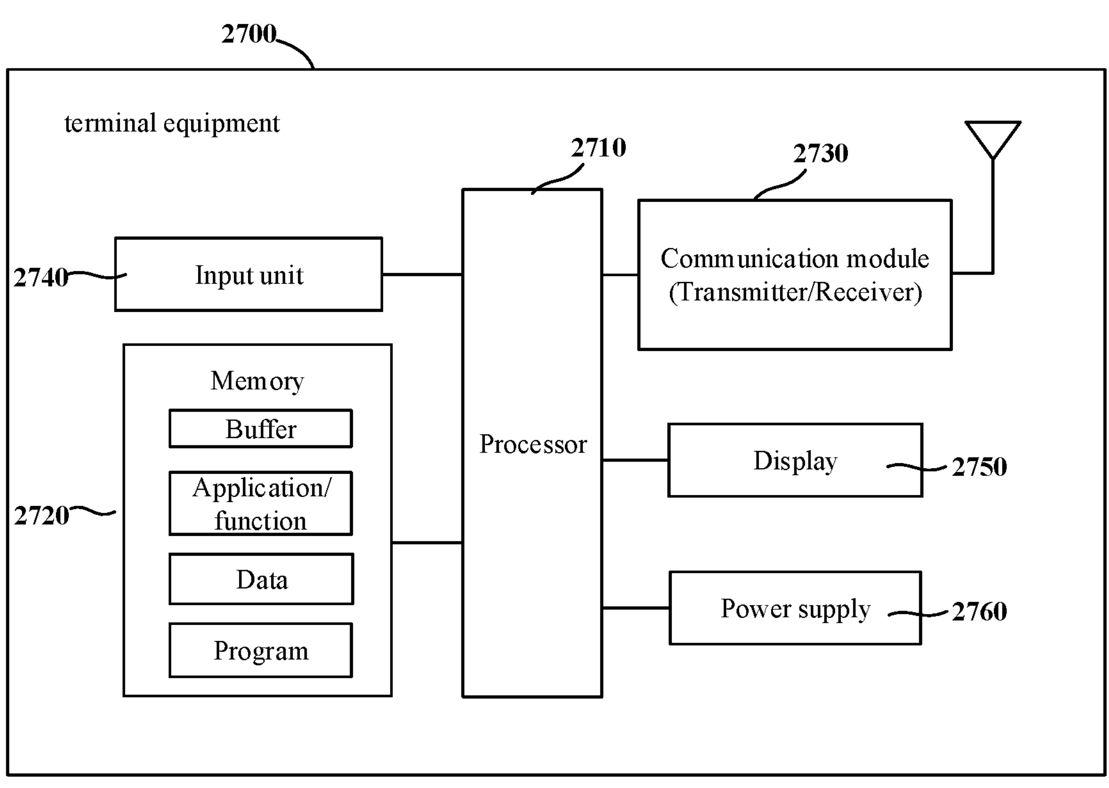
FIG. 27 is a block diagram of a systematic structure of the terminal equipment of Embodiment 6 of this disclosure.

FIG. 27 is a block diagram of a systematic structure of the terminal equipment of Embodiment 6 of this disclosure. As shown in FIG. 27, a terminal equipment 2700 may include a processor 2710 and a memory 2720, the memory 2720 being coupled to the processor 2710. It should be noted that this figure is illustrative only, and other types of structures may also be used, so as to supplement or replace this structure and achieve a telecommunications function or other functions.

In one implementation, the functions of the apparatus for processing a radio link failure may be integrated into the processor 2710. The processor 2710 may be configured to: detect or trigger a radio link failure; and perform cell selection, wherein prioritizing a conditional reconfiguration candidate cell to select; or perform cell selection; and perform cell reselection when a selected cell is not a conditional reconfiguration candidate cell; or attempt conditional reconfiguration execution.

In another implementation, the apparatus for processing a radio link failure and the processor 2710 may be configured separately; for example, the apparatus for processing a radio link failure may be configured as a chip connected to the processor 2710, and the functions of the apparatus for processing a radio link failure are executed under control of the processor 2710.

As shown in FIG. 27, the terminal equipment 2700 may further include a communication module 2730, an input unit 2740, a display 2750 and a power supply 2760. It should be noted that the terminal equipment 2700 does not necessarily include all the parts shown in FIG. 27. Furthermore, the terminal equipment 2700 may include parts not shown in FIG. 27, and the related art may be referred to.

As shown in FIG. 27, the processor 2710 is sometimes referred to as a controller or an operational control, which may include a microprocessor or other processor devices and/or logic devices. The processor 2710 receives input and controls operations of components of the terminal equipment 2700.

Wherein, the memory 2720 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 2710 may execute programs stored in the memory 2720, so as to realize information storage or processing, etc. Functions of other parts are similar to those of the related art, which shall not be described herein any further. The parts of the terminal equipment 2700 may be realized by specific hardware, firmware, software, or any combination thereof, without departing from the scope of this disclosure.

It can be seen from the above embodiment that when a radio link failure is detected or triggered, prioritizing a conditional reconfiguration candidate cell to select; or, when the selected cell is not a conditional reconfiguration candidate cell, cell reselection is performed; or, directly attempting conditional reconfiguration execution without performing cell selection, which is able to prioritizing a conditional reconfiguration cell to select and/or prioritizing conditional reconfiguration execution to attempt, thereby avoiding significant service interruption and improving system performance and user experiences.

Embodiment 7

The embodiment of this disclosure provides a network device, including the apparatus for processing radio link failures described in Embodiment 5.

Figure 28:
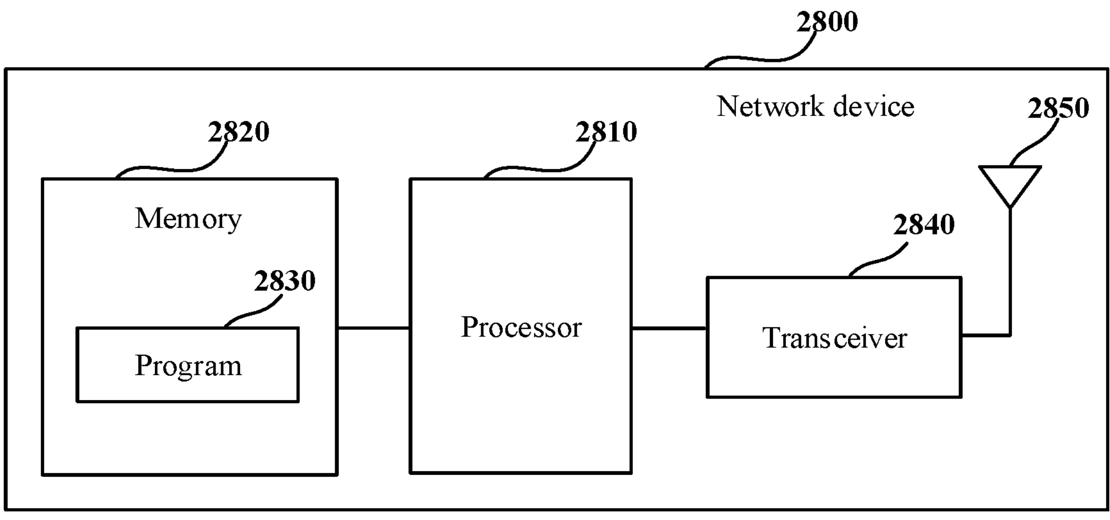
FIG. 28 is a block diagram of a systematic structure of the network device of Embodiment 7 of this disclosure.

FIG. 28 is a schematic diagram of a systematic structure of the network device of Embodiment 7 of this disclosure. As shown in FIG. 28, a network device 2800 may include a processor 2810 and a memory 2820, the memory 2820 being coupled to the processor 2810. Wherein, the memory 2820 may store various data, and furthermore, it may store a program 2830 for data processing, and execute the program 2830 under control of the processor 2810, so as to receive various information transmitted by a terminal equipment, and transmit various information to the terminal equipment.

In one implementation, the functions of the apparatus for processing radio link failures may be integrated into the processor 2810. Wherein, the processor 2810 may be configured to: configure a terminal equipment to attempt conditional reconfiguration execution after a radio link fail and/or configure the terminal equipment with information on a conditional reconfiguration candidate cell.

In another implementation, the apparatus for processing radio link failures and the processor 2810 may be configured separately; for example, the apparatus for processing radio link failures may be configured as a chip connected to the processor 2810, and the functions of the apparatus for processing radio link failures are executed under control of the processor 2810.

Furthermore, as shown in FIG. 28, the network device 2800 may include a transceiver 2840, and an antenna 2850, etc. Wherein, functions of the above components are similar to those in the related art, and shall not be described herein any further. It should be noted that the network device 2800 does not necessarily include all the parts shown in FIG. 28. Furthermore, the network device 2800 may include parts not shown in FIG. 28, and the related art may be referred to.

It can be seen from the above embodiment that the network device configures the terminal equipment to attempt conditional reconfiguration execution and/or information on a conditional reconfiguration candidate cell, so that the terminal equipment performs cell selection based on the configuration, and the terminal equipment may prioritizing a conditional reconfiguration cell to select and/or prioritizing conditional reconfiguration execution to attempt, thereby avoiding significant service interruption and improving system performance and user experiences.

Embodiment 8

The embodiment of this disclosure provides a communication system, including the terminal equipment described in Embodiment 6 and/or the network device described in Embodiment 7. Reference may be made to Embodiment 6 and Embodiment 7 for detailed contents.

For example, reference may be made to FIG. 1 for a structure of the communication system. As shown in FIG. 1, the communication system 100 includes a network device 101 and a terminal equipment 102. The terminal equipment 102 is identical to the terminal equipment described in Embodiment 6, and the network device 101 is identical to the network device in Embodiment 7, with identical contents being not going to be described herein any further.

For another example, reference may be made to FIG. 2 for a structure of the communication system, in which the IAB-donor corresponds to the network device, and the IAB-MT of the IAB-node corresponds to the terminal equipment. Reference may be made to description of the network device and the terminal equipment for detailed contents, which shall not be described herein any further.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 25 may either correspond to software modules of procedures of a computer program, or correspond to hardware modules. Such software modules may respectively correspond to the steps shown in FIG. 7. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 25 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 25 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

According to the above implementations disclosed in the embodiments, following supplements are further disclosed.

Supplement I

1. An apparatus for processing a radio link failure, applicable to a terminal equipment, the apparatus comprising:

a detecting unit configured to detect or trigger a radio link failure; and a first selecting unit configured to perform cell selection, wherein the first selecting unit prioritizes a conditional reconfiguration candidate cell to select; or a second selecting unit configured to perform cell selection; and a first reselecting unit configured to perform cell reselection when a selected cell is not a conditional reconfiguration candidate cell; or a first executing unit configured to attempt conditional reconfiguration execution.

2. The apparatus according to supplement 1, wherein the first selecting unit comprises:

a first searching unit configured to leverage stored information on conditional reconfiguration to perform cell search and select a suitable cell; and a first applying unit is used to apply stored conditional reconfiguration of a selected cell.

3. The apparatus according to supplement 2, wherein the first searching unit comprises:

a second searching unit configured to leverage stored information on a conditional reconfiguration candidate cell or previously received information on a conditional reconfiguration candidate cell to perform cell search; and a first selecting unit configured to select a suitable cell when the suitable cell is found.

4. The apparatus according to supplement 3, wherein, the second searching unit is configured to leverage the stored information on a conditional reconfiguration candidate cell or the previously received information on a conditional reconfiguration candidate cell to perform cell search when a network configured the terminal equipment to try conditional reconfiguration execution after the radio link failure, the terminal equipment stored the information of the conditional reconfiguration candidate cell or the terminal equipment previously received the information of the conditional reconfiguration candidate cell.

5. The apparatus according to supplement 3 or 4, wherein the first selecting unit further comprises:

a third searching unit configured to perform cell search leveraging at least one of the stored information of frequencies information on cell parameters from previously received measurement control information element and from previously detected cells when no suitable cell is found; and a second selecting unit configured to select a suitable cell when the suitable cell is found.

6. The apparatus according to supplement 5, wherein the first selecting unit further comprises:

a first starting unit configured to start a third selecting unit to perform initial cell selection when no suitable cell is found, the third selecting unit comprising:

a first scanning unit configured to scan radio frequency channels in an NR frequency band;

a fourth searching unit configured to search for a strongest cell on each frequency; wherein for operation with shared spectrum channel access, at least one next strongest cell is searched for on each frequency; and a fourth selecting unit configured to select a suitable cell when the suitable cell is found.

7. The apparatus according to supplement 2, wherein the first searching unit comprises:

a fifth searching unit configured to, when a network device configured the terminal equipment to try conditional reconfiguration execution after a radio link failure and the terminal equipment stores the information on a conditional reconfiguration candidate cell or the terminal equipment previously received information on a conditional reconfiguration candidate cell, perform cell search by using at least one of stored frequency information, a previously received measurement control element and cell parameter information of a cell detected previously; and a fifth selecting unit configured to, when a suitable cell is found and the suitable cell is a conditional reconfiguration candidate cell, select the suitable cell.

8. The apparatus according to supplement 7, wherein the first searching unit further comprises:

a sixth searching unit configured to, when the network device does not configure the terminal equipment to attempt conditional reconfiguration execution after the radio link failure or the terminal equipment does not store the information on a conditional reconfiguration candidate cell or the terminal equipment did not previously receive the information on a conditional reconfiguration candidate cell, perform cell search leveraging at least one of the stored information of frequencies information on cell parameters from previously received measurement control information element and from previously detected cells; and a sixth selecting unit configured to, when a suitable cell is found, select the suitable cell.

9. The apparatus according to supplement 7 or 8, wherein the first selecting unit further comprises:

a second starting unit configured to start a seventh selecting unit to perform initial cell selection when no suitable cell is found or when a suitable cell is found but the suitable cell is not selected, the seventh selecting unit comprising:

a second scanning unit configured to scan radio frequency channels in an NR frequency band;

a seventh searching unit configured to search for a strongest cell on each frequency; wherein for operation with shared spectrum channel access, or when a network configured the terminal equipment to try conditional reconfiguration execution after the radio link failure and the terminal equipment stored the information of the conditional reconfiguration candidate cell or the terminal equipment previously received the information of the conditional reconfiguration candidate cell, the seventh searching unit searches for at least one next strongest cell on each frequency; and an eighth selecting unit configured to select a suitable cell when the suitable cell is found and the suitable cell is a conditional reconfiguration candidate cell.

10. The apparatus according to supplement 9, wherein, when the network configured the terminal equipment to try conditional reconfiguration execution after a radio link failure and the terminal equipment stores the information on a conditional reconfiguration candidate cell or the terminal equipment previously received information on a conditional reconfiguration candidate cell, the number of strongest cells and next strongest cells searched by the seventh searching unit on each frequency is N, N being greater than 1.

11. The apparatus according to supplement 10, wherein, N is determined based on implementation, or is configured by the network, or is specified in standards.

12. The apparatus according to supplement 7 or 8, wherein the first selecting unit further comprises:

a third starting unit configured to start a ninth selecting unit to start initial cell selection when no suitable cell is found, the ninth selecting unit comprising:

a third scanning unit configured to scan radio frequency (RF) channels in an NR frequency band;

an eighth searching unit configured to search for a strongest cell on each frequency, wherein for operation with shared spectrum channel access, it also searches for at least one next strongest cell on each frequency; and a tenth selecting unit configured to select a suitable cell when the network configured the terminal equipment to try conditional reconfiguration execution after the radio link failure, the terminal equipment stored the information of the conditional reconfiguration candidate cell or the terminal equipment previously received the information of the conditional reconfiguration candidate cell, a second condition is fulfilled, the suitable cell is found and the suitable cell is a conditional reconfiguration candidate cell.

13. The apparatus according to supplement 12, wherein the ninth selecting unit further comprises:

an eleventh selecting unit configured to, when the network does not configure the terminal equipment to attempt conditional reconfiguration execution after the radio link failure or the terminal equipment does not store the information on a conditional reconfiguration candidate cell or the terminal equipment did not previously receive the information on a conditional reconfiguration candidate cell, or when the network configured the terminal equipment to try conditional reconfiguration execution after the radio link failure or the terminal equipment stores the information on a conditional reconfiguration candidate cell or the terminal equipment previously received the information on a conditional reconfiguration candidate cell and a first conditional is fulfilled, select a suitable cell when the suitable cell is found.

14. The apparatus according to supplement 13, wherein, the first condition includes that:

a first timer expires, wherein when the terminal equipment scans the RF channels in the NR frequency band, or when the terminal equipment scans the RF channels in the NR frequency band and the first timer is configured, the first timer is started, and the first timer is stopped when a suitable cell is found; or, the terminal equipment has scanned all RF channels in the NR frequency band and all found suitable cells are not conditional reconfiguration candidate cells.

15. The apparatus according to supplement 12, wherein, the second condition includes that:

the first timer is not configured, or, the first timer is running, or, the first timer is configured and is running, or, the terminal equipment has not yet scanned all RF channels in the NR frequency band;

wherein when the terminal equipment scans the RF channels in the NR frequency band, or when the terminal equipment scans the RF channels in the NR frequency band and the first timer is configured, the first timer is started, and when a suitable cell is found, the first timer is stopped.

16. The apparatus according to supplement 1, wherein the first selecting unit includes:

a twelfth selecting unit configured to, in an S criterion used in cell selection, use a parameter for a conditional reconfiguration candidate cell different from that used for a non-conditional reconfiguration candidate cell.

17. The apparatus according to supplement 16, wherein in the S criterion, a threshold or offset different from that used for a non-conditional reconfiguration candidate cell is used for the conditional reconfiguration candidate cell.

18. The apparatus according to supplement 16 or 17, wherein, the parameter or threshold or offset is provided by system information or an RRC dedicated message.

19. The apparatus according to supplement 1, wherein, the first reselecting unit is configured to perform cell reselection within a period of time when the network configured the terminal equipment to try conditional reconfiguration execution after the radio link failure and a selected cell is not a conditional reconfiguration candidate cell.

20. The apparatus according to supplement 19, wherein the first reselecting unit comprises:

a second reselecting unit configured to, when the network configured the terminal equipment to try conditional reconfiguration execution after a radio link failure, the selected cell is not a conditional reconfiguration candidate cell and a condition for cell reselection is fulfilled, perform cell reselection within a period of time.

21. The apparatus according to supplement 20, wherein, the condition for the cell reselection includes that it is found that other cells have better quality than the current cell.

22. The apparatus according to supplement 19, wherein the apparatus further comprises:

a second executing unit configured to attempt conditional reconfiguration execution once when the reselected cell is a conditional reconfiguration candidate cell.

23. The apparatus according to supplement 22, wherein the apparatus further comprises:

a first reestablishing unit configured to perform connection reestablishment on the reselected cell when the reselected cell is not a conditional reconfiguration candidate cell.

24. The apparatus according to supplement 19, wherein, the first selecting unit prioritizes a conditional reconfiguration candidate cell to select in performing cell reselection.

25. The apparatus according to supplement 24, wherein, the terminal equipment considers that a conditional reconfiguration candidate frequency or a frequency of the conditional reconfiguration candidate cell to be a high priority, or the conditional reconfiguration candidate frequency or a frequency other than the frequency of the conditional reconfiguration candidate cell to be a low priority.

26. The apparatus according to supplement 24 or 25, wherein, in an R criterion for ordering intra-frequency cells and inter-frequency cells with identical priorities, an offset different from that used in a non-conditional reconfiguration candidate cell is used for a conditional reconfiguration candidate cell.

27. The apparatus according to supplement 19, wherein the apparatus further comprises:

a third executing unit configured to attempt conditional reconfiguration execution once when the selected cell is a conditional reconfiguration candidate cell and the network configured the terminal equipment to try conditional reconfiguration execution after a radio link failure.

28. The apparatus according to supplement 19, wherein the apparatus further comprises:

a second reestablishing unit configured to perform connection reestablishment on the selected cell when the network does not configure terminal equipment to attempt conditional reconfiguration execution after the radio link failure.

29. The apparatus according to supplement 1, wherein the first executing unit comprises:

a fourth executing unit configured to attempt conditional reconfiguration execution once when AS security has been activated and an SRB2 and at least one DRB have been setup, or, for an IAB, when AS security has been activated and an SRB2 has been setup, and when a timer T316 is not configured or SCG transmission is suspended or PSCell change is ongoing, a third condition is fulfilled for a conditional reconfiguration candidate cell and the network configured the terminal equipment to try conditional reconfiguration execution or other similar behaviors after the radio link failure.

30. The apparatus according to supplement 29, wherein, the third condition comprises that:

for a conditional reconfiguration candidate cell, $S_{rxlev}>0$ and/or $S_{qual}>0$; where, $S_{rxlev}$ denotes a cell selection RX level value, and $S_{qual}$ denotes a cell selection quality value; or, quality of the conditional reconfiguration candidate cell is better than a first threshold; or, for a case where dual-connectivity is configured, when a radio link failure of a master cell group is detected, the quality of the conditional reconfiguration candidate cell is better than that of a PSCell or the quality of the conditional reconfiguration candidate cell is offset better than the PSCell; and when a radio link failure of a secondary cell group is detected, the quality of the conditional reconfiguration candidate cell is better than quality of a secondary cell of a secondary cell group or the quality of the conditional reconfiguration candidate cell is offset better than the secondary cell of the secondary cell group.

31. The apparatus according to supplement 29 or 30, wherein the first executing unit comprises:

a thirteenth selecting unit configured to, when the third condition is fulfilled for more than one conditional reconfiguration candidate cell, select one of the more than one conditional reconfiguration candidate cell; and a fifth executing unit configured to attempt conditional reconfiguration execution once.

32. The apparatus according to supplement 31, wherein the thirteenth selecting unit comprises:

a fourteenth selecting unit configured to select a conditional reconfiguration candidate cell based on implementation; or a fifteenth selecting unit configured to select a conditional reconfiguration candidate cell on a frequency with a highest priority, wherein when there are more than one conditional reconfiguration candidate cell at the frequency with a highest priority that fulfill the third condition, ranking is performed according to the R criterion, and a conditional reconfiguration candidate cell with a highest Rn value is selected; or a sixteenth selecting unit configured to select a conditional reconfiguration candidate cell according to an order of occurrences in a configured or stored variable 33. The apparatus according to any one of supplements 29-31, wherein the apparatus further comprises:

a sixth executing unit configured to perform a behavior of reconfiguration failure when the conditional reconfiguration execution fails; or, a seventh executing unit configured to select another conditional reconfiguration candidate cell and attempt conditional reconfiguration execution once.

34. The apparatus according to supplement 33, wherein, the seventh executing unit selects another conditional reconfiguration candidate cell to attempt conditional reconfiguration execution once, until all or M conditional reconfiguration candidate cells fulfilling the third condition have been attempted, or until timer T3xy expires, wherein timer T3xy is started when attempting conditional reconfiguration execution is started or the radio link fails, x and y are natural numbers from 0 to 9.

35. The apparatus according to supplement 34, wherein, M is configured by the network, or is specified in standards, or is determined based on implementation.

36. The apparatus according to any one of supplements 1-35, wherein, the conditional reconfiguration candidate cell includes a conditional handover (CHO) candidate cell and/or a conditional PSCell change candidate cell.

37. An apparatus for processing radio link failures, applicable to a network device, the apparatus comprising:

a first configuring unit configured to configure a terminal equipment to attempt conditional reconfiguration execution after a radio link fail and/or configure the terminal equipment with information on a conditional reconfiguration candidate cell.

38. The apparatus according to supplement 37, wherein, the first configuring unit configures the terminal equipment with attemptCondReconfig.

39. The apparatus according to supplement 37, wherein the apparatus further comprises:

a second configuring unit configured to configure the terminal equipment with a first timer and/or a value of the first timer, wherein when the terminal equipment scans radio frequency channels in an NR frequency band or when the terminal equipment scans radio frequency channels in an NR frequency band and the first timer is configured, the first timer is started, and when a suitable cell is found, the first timer is stopped.

40. The apparatus according to supplement 37, wherein the apparatus further comprises:

a third configuring unit configured to configure the terminal equipment with a parameter or a threshold or an offset used for a conditional reconfiguration candidate cell in an S criterion used in cell selection different from that used for a non-conditional reconfiguration candidate cell.

41. The apparatus according to supplement 40, wherein, the parameter or threshold or offset is provided by system information or an RRC dedicated message.

42. The apparatus according to supplement 37, wherein the apparatus further comprises:

a fourth configuring unit configured to configure the terminal equipment with the number N of strongest cells and next strongest cells searched on each frequency.

43. The apparatus according to supplement 37, wherein the apparatus further comprises:

a fifth configuring unit configured to configure the terminal equipment with the number M of conditional reconfiguration candidate cells in selecting to attempt conditional reconfiguration execution once when the conditional reconfiguration execution fails.

44. The apparatus according to supplement 37, wherein the apparatus further comprises:

a sixth configuring unit configured to configure the terminal equipment with timer T3xy, wherein timer T3xy is started when attempting conditional reconfiguration execution is started or the radio link fails, x and y are natural numbers from 0 to 9.

45. The apparatus according to supplement 37, wherein the apparatus further comprises:

a seventh configuring unit configured to configure a cell reselection parameter for the terminal equipment.

46. The apparatus according to supplement 45, wherein the configuring cell reselection parameter includes: configuring a high priority for a conditional reconfiguration candidate frequency or a frequency where the conditional reconfiguration candidate cell is located, or configuring a low priority for a frequency other than a conditional reconfiguration candidate frequency or a frequency where the conditional reconfiguration candidate cell is located.

47. The apparatus according to supplement 45, wherein the configuring cell reselection parameter includes: in an R criterion for ordering intra-frequency cells and inter-frequency cells with identical priorities, configuring an offset different from that used in a non-conditional reconfiguration candidate cell for a conditional reconfiguration candidate cell.

48. A terminal equipment, comprising the apparatus according to any one of supplements 1-36.

49. A network device, comprising the apparatus according to any one of supplements 37-47.

50. A communication system, comprising the terminal equipment according to supplement 48 and/or the network device according to supplement 49.

Supplement II

1. A method for processing a radio link failure, applicable to a terminal equipment, the method comprising:

detecting or triggering a radio link failure; and performing cell selection, wherein prioritizing a conditional reconfiguration candidate cell to select; or performing cell selection; and performing cell reselection when a selected cell is not a conditional reconfiguration candidate cell; or attempting conditional reconfiguration execution.

2. The method according to supplement 1, wherein the performing cell selection, wherein prioritizing a conditional reconfiguration candidate cell to select, comprises:

using stored information on conditional reconfiguration to perform cell search and select a suitable cell; and applying stored conditional reconfiguration of a selected cell.

3. The method according to supplement 2, wherein the using stored information on conditional reconfiguration to perform cell search and select a suitable cell comprises:

using stored information on a conditional reconfiguration candidate cell or previously received information on a conditional reconfiguration candidate cell to perform cell search; and selecting a suitable cell when the suitable cell is found.

4. The method according to supplement 3, wherein the using stored information on a conditional reconfiguration candidate cell or previously received information on a conditional reconfiguration candidate cell to perform cell search comprises:

using the stored information on a conditional reconfiguration candidate cell or the previously received information on a conditional reconfiguration candidate cell to perform cell search when a network configured the terminal equipment to try conditional reconfiguration execution after the radio link failure, the terminal equipment stored the information of the conditional reconfiguration candidate cell or the terminal equipment previously received the information of the conditional reconfiguration candidate cell.

5. The method according to supplement 3 or 4, wherein the performing cell selection, wherein prioritizing a conditional reconfiguration candidate cell to select, further comprises:

when no suitable cell is found, performing cell search leveraging at least one of the stored information of frequencies information on cell parameters from previously received measurement control information element and from previously detected cells; and selecting a suitable cell when the suitable cell is found.

6. The method according to supplement 5, wherein the performing cell selection, wherein prioritizing a conditional reconfiguration candidate cell to select, further comprises:

starting initial cell selection when no suitable cell is found, the initial cell selection comprising:

scanning radio frequency channels in an NR frequency band;

searching for a strongest cell on each frequency; wherein for operation with shared spectrum channel access, at least one next strongest cell is searched for on each frequency; and selecting a suitable cell when the suitable cell is found.

7. The method according to supplement 2, wherein the using stored information on conditional reconfiguration to perform cell search and select a suitable cell comprises:

when a network device configured the terminal equipment to try conditional reconfiguration execution after a radio link failure and the terminal equipment stores the information on a conditional reconfiguration candidate cell or the terminal equipment previously received information on a conditional reconfiguration candidate cell, performing cell search by using at least one of stored frequency information, a previously received measurement control element and cell parameter information of a cell detected previously; and when a suitable cell is found and the suitable cell is a conditional reconfiguration candidate cell, selecting the suitable cell.

8. The method according to supplement 7, wherein the using stored information on conditional reconfiguration to perform cell search and select a suitable cell further comprises:

when the network device does not configure the terminal equipment to attempt conditional reconfiguration execution after the radio link failure or the terminal equipment does not store the information on a conditional reconfiguration candidate cell or the terminal equipment did not previously receive the information on a conditional reconfiguration candidate cell, performing cell search leveraging at least one of the stored information of frequencies information on cell parameters from previously received measurement control information element and from previously detected cells; and when a suitable cell is found, selecting the suitable cell.

9. The method according to supplement 7 or 8, wherein the performing cell selection, wherein prioritizing a conditional reconfiguration candidate cell to select, further comprises:

starting initial cell selection when no suitable cell is found or when a suitable cell is found but the suitable cell is not selected, the initial cell selection comprising:

scanning radio frequency channels in an NR frequency band;

searching for a strongest cell on each frequency; wherein for operation with shared spectrum channel access, or when a network configured the terminal equipment to try conditional reconfiguration execution after the radio link failure and the terminal equipment stored the information of the conditional reconfiguration candidate cell or the terminal equipment previously received the information of the conditional reconfiguration candidate cell, at least one next strongest cell is searched on each frequency; and selecting a suitable cell when the suitable cell is found and the suitable cell is a conditional reconfiguration candidate cell.

10. The method according to supplement 9, wherein, when the network configured the terminal equipment to try conditional reconfiguration execution after a radio link failure and the terminal equipment stores the information on a conditional reconfiguration candidate cell or the terminal equipment previously received information on a conditional reconfiguration candidate cell, the number of strongest cells and next strongest cells searched on each frequency is N, N being greater than 1.

11. The method according to supplement 10, wherein,

N is determined based on implementation, or is configured by the network, or is specified in standards.

12. The method according to supplement 7 or 8, wherein the performing cell selection, wherein prioritizing a conditional reconfiguration candidate cell to select, further comprises:

starting initial cell selection when no suitable cell is found, the initial cell selection comprising:

scanning radio frequency channels in an NR frequency band;

searching for a strongest cell on each frequency, wherein for operation with shared spectrum channel access, at least one next strongest cell is searched on each frequency; and selecting a suitable cell when the network configured the terminal equipment to try conditional reconfiguration execution after the radio link failure, the terminal equipment stored the information of the conditional reconfiguration candidate cell or the terminal equipment previously received the information of the conditional reconfiguration candidate cell, a second condition is fulfilled, the suitable cell is found and the suitable cell is a conditional reconfiguration candidate cell.

13. The method according to supplement 12, wherein the initial cell selection further comprises:

when the network does not configure the terminal equipment to attempt conditional reconfiguration execution after the radio link failure or the terminal equipment does not store the information on a conditional reconfiguration candidate cell or the terminal equipment did not previously receive the information on a conditional reconfiguration candidate cell, or when the network configured the terminal equipment to try conditional reconfiguration execution after the radio link failure or the terminal equipment stores the information on a conditional reconfiguration candidate cell or the terminal equipment previously received the information on a conditional reconfiguration candidate cell and a first conditional is fulfilled, selecting a suitable cell when the suitable cell is found.

14. The method according to supplement 13, wherein, the first condition includes that:

a first timer expires, wherein when the terminal equipment scans the RF channels in the NR frequency band, or when the terminal equipment scans the RF channels in the NR frequency band and the first timer is configured, the first timer is started, and the first timer is stopped when a suitable cell is found; or, the terminal equipment has scanned all RF channels in the NR frequency band and all found suitable cells are not conditional reconfiguration candidate cells.

15. The method according to supplement 12, wherein, the second condition includes that:

the first timer is not configured, or, the first timer is running, or, the first timer is configured and is running, or, the terminal equipment has not yet scanned all RF channels in the NR frequency band;

wherein when the terminal equipment scans the RF channels in the NR frequency band, or when the terminal equipment scans the RF channels in the NR frequency band and the first timer is configured, the first timer is started, and when a suitable cell is found, the first timer is stopped.

16. The method according to supplement 1, wherein the performing cell selection, wherein prioritizing a conditional reconfiguration candidate cell to select, further comprises:

in an S criterion used in cell selection, using a parameter for a conditional reconfiguration candidate cell different from that used for a non-conditional reconfiguration candidate cell.

17. The method according to supplement 16, wherein, in the S criterion, a threshold or offset different from that used for a non-conditional reconfiguration candidate cell is used for the conditional reconfiguration candidate cell.

18. The method according to supplement 16 or 17, wherein, the parameter or threshold or offset is provided by system information or an RRC dedicated message.

19. The method according to supplement 1, wherein the performing cell selection when a selected cell is not a conditional reconfiguration candidate cell comprises:

performing cell reselection within a period of time when the network configured the terminal equipment to try conditional reconfiguration execution after the radio link failure and a selected cell is not a conditional reconfiguration candidate cell.

20. The method according to supplement 19, wherein the performing cell reselection within a period of time when the network configured the terminal equipment to try conditional reconfiguration execution after the radio link failure and a selected cell is not a conditional reconfiguration candidate cell comprises:

when the network configured the terminal equipment to try conditional reconfiguration execution after a radio link failure, the selected cell is not a conditional reconfiguration candidate cell and a condition for cell reselection is fulfilled, performing cell reselection within a period of time.

21. The method according to supplement 20, wherein, the condition for the cell reselection includes that it is found that other cells have better quality than the current cell.

22. The method according to supplement 19, wherein the method further comprises:

attempting conditional reconfiguration execution once when the reselected cell is a conditional reconfiguration candidate cell.

23. The method according to supplement 22, wherein the method further comprises:

performing connection reestablishment on the reselected cell when the reselected cell is not a conditional reconfiguration candidate cell.

24. The method according to supplement 19, wherein, prioritizing a conditional reconfiguration candidate cell to select in performing cell reselection.

25. The method according to supplement 24, wherein, the terminal equipment considers that a conditional reconfiguration candidate frequency or a frequency of the conditional reconfiguration candidate cell to be a high priority, or the conditional reconfiguration candidate frequency or a frequency other than the frequency of the conditional reconfiguration candidate cell to be a low priority.

26. The method according to supplement 24 or 25, wherein, in an R criterion for ordering intra-frequency cells and inter-frequency cells with identical priorities, an offset different from that used in a non-conditional reconfiguration candidate cell is used for a conditional reconfiguration candidate cell.

27. The method according to supplement 19, wherein the method further comprises:

attempting conditional reconfiguration execution once when the selected cell is a conditional reconfiguration candidate cell and the network configured the terminal equipment to try conditional reconfiguration execution after a radio link failure.

28. The method according to supplement 19, wherein the method further comprises:

performing connection reestablishment on the selected cell when the network does not configure terminal equipment to attempt conditional reconfiguration execution after the radio link failure.

29. The method according to supplement 1, wherein the attempting conditional reconfiguration execution comprises:

attempting conditional reconfiguration execution once when AS security has been activated and an SRB2 and at least one DRB have been setup, or, for an IAB, when AS security has been activated and an SRB2 has been setup, and attempting conditional reconfiguration execution once when a timer T316 is not configured or SCG transmission is suspended or PSCell change is ongoing, a third condition is fulfilled for a conditional reconfiguration candidate cell and the network configured the terminal equipment to try conditional reconfiguration execution or other similar behaviors after the radio link failure.

30. The method according to supplement 29, wherein, the third condition comprises that:

for a conditional reconfiguration candidate cell, $S_{rxlev}>0$ and/or $S_{qual}>0$; where, $S_{rxlev}$ denotes a cell selection RX level value, and $S_{qual}$ denotes a cell selection quality value; or, quality of the conditional reconfiguration candidate cell is better than a first threshold; or, for a case where dual-connectivity is configured, when a radio link failure of a master cell group is detected, the quality of the conditional reconfiguration candidate cell is better than that of a PSCell or the quality of the conditional reconfiguration candidate cell is offset better than the PSCell; and when a radio link failure of a secondary cell group is detected, the quality of the conditional reconfiguration candidate cell is better than quality of a secondary cell of a secondary cell group or the quality of the conditional reconfiguration candidate cell is offset better than the secondary cell of the secondary cell group.

31. The method according to supplement 29 or 30, wherein, when the third condition is fulfilled for more than one conditional reconfiguration candidate cell, one of the more than one conditional reconfiguration candidate cell is select, and conditional reconfiguration execution is attempted once.

32. The method according to supplement 31, wherein that one of the more than one conditional reconfiguration candidate cell is select comprises:

selecting a conditional reconfiguration candidate cell based on implementation; or selecting a conditional reconfiguration candidate cell on a frequency with a highest priority, wherein when there are more than one conditional reconfiguration candidate cell at the frequency with a highest priority that fulfill the third condition, ranking is performed according to the R criterion, and a conditional reconfiguration candidate cell with a highest Rn value is selected; or selecting a conditional reconfiguration candidate cell according to an order of occurrences in a configured or stored variable 33. The method according to any one of supplements 29-31, wherein the method further comprises:

performing a behavior of reconfiguration failure when the conditional reconfiguration execution fails; or, selecting another conditional reconfiguration candidate cell and attempting conditional reconfiguration execution once.

34. The method according to supplement 33, wherein the selecting another conditional reconfiguration candidate cell and attempting conditional reconfiguration execution once comprises:

selecting another conditional reconfiguration candidate cell to attempt conditional reconfiguration execution once, until all or M conditional reconfiguration candidate cells fulfilling the third condition have been attempted, or until timer T3xy expires, wherein timer T3xy is started when attempting conditional reconfiguration execution is started or the radio link fails, x and y are natural numbers from 0 to 9.

35. The method according to supplement 34, wherein,

M is configured by the network, or is specified in standards, or is determined based on implementation.

36. The method according to any one of supplements 1-35, wherein, the conditional reconfiguration candidate cell includes a conditional handover (CHO) candidate cell and/or a conditional PSCell change candidate cell.

37. A method for processing radio link failures, applicable to a network device, the method comprising:

configuring a terminal equipment to attempt conditional reconfiguration execution after a radio link fail and/or configuring the terminal equipment with information on a conditional reconfiguration candidate cell.

38. The method according to supplement 37, wherein the configuring a terminal equipment to attempt conditional reconfiguration execution after a radio link fail comprises:

configuring the terminal equipment with attemptCondReconfig.

39. The method according to supplement 37, wherein the method further comprises:

configuring the terminal equipment with a first timer and/or a value of the first timer, wherein when the terminal equipment scans radio frequency channels in an NR frequency band or when the terminal equipment scans radio frequency channels in an NR frequency band and the first timer is configured, the first timer is started, and when a suitable cell is found, the first timer is stopped.

40. The method according to supplement 37, wherein the method further comprises:

configuring the terminal equipment with a parameter or a threshold or an offset used for a conditional reconfiguration candidate cell in an S criterion used in cell selection different from that used for a non-conditional reconfiguration candidate cell.

41. The method according to supplement 40, wherein, the parameter or threshold or offset is provided by system information or an RRC dedicated message.

42. The method according to supplement 37, wherein the method further comprises:

configuring the terminal equipment with the number N of strongest cells and next strongest cells searched on each frequency.

43. The method according to supplement 37, wherein the method further comprises:

configuring the terminal equipment with the number M of conditional reconfiguration candidate cells in selecting to attempt conditional reconfiguration execution once when the conditional reconfiguration execution fails.

44. The method according to supplement 37, wherein the method further comprises: configuring the terminal equipment with timer T3xy, wherein timer T3xy is started when attempting conditional reconfiguration execution is started or the radio link fails, x and y are natural numbers from 0 to 9.

45. The method according to supplement 37, wherein the method further comprises:

configuring a cell reselection parameter for the terminal equipment.

46. The method according to supplement 45, wherein the configuring cell reselection parameter includes: configuring a high priority for a conditional reconfiguration candidate frequency or a frequency where the conditional reconfiguration candidate cell is located, or configuring a low priority for a frequency other than a conditional reconfiguration candidate frequency or a frequency where the conditional reconfiguration candidate cell is located.

47. The method according to supplement 45, wherein the configuring cell reselection parameter includes: in an R criterion for ordering intra-frequency cells and inter-frequency cells with identical priorities, configuring an offset different from that used in a non-conditional reconfiguration candidate cell for a conditional reconfiguration candidate cell.

The invention claimed is:

1. An apparatus for processing a radio link failure, applicable to a terminal equipment, the apparatus comprising:

a detector configured to detect or trigger a radio link failure; and first selecting processor circuitry configured to perform cell selection, wherein the first selecting processor circuitry prioritizes a conditional reconfiguration candidate cell to select; or second selecting processor circuitry configured to perform cell selection; and first reselecting processor circuitry configured to perform cell reselection when a selected cell is not a conditional reconfiguration candidate cell; or first executing processor circuitry configured to attempt conditional reconfiguration execution, wherein the first executing processor circuitry comprises:

fourth executing processor circuitry configured to attempt conditional reconfiguration execution once when Access Stratum (AS) security has been activated and Signaling Radio Bearer 2 (SRB2) and at least one Data Radio Bearer (DRB) have been setup, or, for an Integrated Access and Backhaul (IAB), when AS security has been activated and an SRB2 has been setup, and when a timer T316 is not configured or a secondary cell group (SCG) transmission is suspended or a primary secondary cell (PSCell) change is ongoing, a third condition is fulfilled for a conditional reconfiguration candidate cell and the network configured the terminal equipment to try conditional reconfiguration execution or other similar behaviors after the radio link failure.

2. The apparatus according to claim 1, wherein the first selecting processor circuitry comprises:

first searching processor circuitry configured to leverage stored information on conditional reconfiguration to perform cell search and select a suitable cell; and first applying processor circuitry is used to apply stored conditional reconfiguration of a selected cell.

3. The apparatus according to claim 2, wherein the first searching processor circuitry comprises:

second searching processor circuitry configured to leverage stored information on a conditional reconfiguration candidate cell or previously received information on a conditional reconfiguration candidate cell to perform cell search; and first selecting processor circuitry configured to select a suitable cell when the suitable cell is found.

4. The apparatus according to claim 2, wherein the first searching processor circuitry comprises:

fifth searching processor circuitry configured to, when a network device configured the terminal equipment to try conditional reconfiguration execution after a radio link failure and the terminal equipment stores the information on a conditional reconfiguration candidate cell or the terminal equipment previously received information on a conditional reconfiguration candidate cell, perform cell search by using at least one of stored frequency information, a previously received measurement control element and cell parameter information of a cell detected previously; and fifth selecting processor circuitry configured to, when a suitable cell is found and the suitable cell is a conditional reconfiguration candidate cell, select the suitable cell.

5. The apparatus according to claim 4, wherein the first searching processor circuitry further comprises:

sixth searching processor circuitry configured to, when the network device does not configure the terminal equipment to attempt conditional reconfiguration execution after the radio link failure or the terminal equipment does not store the information on a conditional reconfiguration candidate cell or the terminal equipment did not previously receive the information on a conditional reconfiguration candidate cell, perform cell search leveraging at least one of the stored information of frequencies information on cell parameters from previously received measurement control information element and from previously detected cells; and sixth selecting processor circuitry configured to, when a suitable cell is found, select the suitable cell.

6. The apparatus according to claim 4, wherein the first selecting processor circuitry further comprises:

second starting processor circuitry configured to start seventh selecting processor circuitry to perform initial cell selection when no suitable cell is found or when a suitable cell is found but the suitable cell is not selected, the seventh selecting processor circuitry comprising:

a second scanner configured to scan radio frequency channels in an NR frequency band;

seventh searching processor circuitry configured to search for a strongest cell on each frequency; wherein for operation with shared spectrum channel access, or when a network configured the terminal equipment to try conditional reconfiguration execution after the radio link failure and the terminal equipment stored the information of the conditional reconfiguration candidate cell or the terminal equipment previously received the information of the conditional reconfiguration candidate cell, the seventh searching processor circuitry searches for at least one next strongest cell on each frequency; and eighth selecting processor circuitry configured to select a suitable cell when the suitable cell is found and the suitable cell is a conditional reconfiguration candidate cell.

7. The apparatus according to claim 4, wherein the first selecting processor circuitry further comprises:

third starting processor circuitry configured to start ninth selecting processor circuitry to start initial cell selection when no suitable cell is found, the ninth selecting processor circuitry comprising:

a third scanner configured to scan radio frequency channels in an NR frequency band;

eighth searching processor circuitry configured to search for a strongest cell on each frequency, wherein for operation with shared spectrum channel access, it also searches for at least one next strongest cell on each frequency; and tenth selecting processor circuitry configured to select a suitable cell when the network configured the terminal equipment to try conditional reconfiguration execution after the radio link failure, the terminal equipment stored the information of the conditional reconfiguration candidate cell or the terminal equipment previously received the information of the conditional reconfiguration candidate cell, a second condition is fulfilled, the suitable cell is found and the suitable cell is a conditional reconfiguration candidate cell.

8. The apparatus according to claim 1, wherein the first selecting processor circuitry comprises:

twelfth selecting processor circuitry configured to, in an S criterion used in cell selection, use a parameter for a conditional reconfiguration candidate cell different from that used for a non-conditional reconfiguration candidate cell.

9. The apparatus according to claim 1, wherein, the first reselecting processor circuitry is configured to perform cell reselection within a period of time when a network configured the terminal equipment to try conditional reconfiguration execution after the radio link failure and a selected cell is not a conditional reconfiguration candidate cell.

10. The apparatus according to claim 9, wherein the apparatus further comprises:

second executing processor circuitry configured to attempt conditional reconfiguration execution once when the reselected cell is a conditional reconfiguration candidate cell.

11. The apparatus according to claim 10, wherein the apparatus further comprises:

first reestablishing processor circuitry configured to perform connection reestablishment on the reselected cell when the reselected cell is not a conditional reconfiguration candidate cell.

12. The apparatus according to claim 1, wherein, the third condition comprises that:

for a conditional reconfiguration candidate cell, $S_{rxlev}>0$ and/or $S_{qual}>0$; where, $S_{rxlev}$ denotes a cell selection RX level value, and $S_{qual}$ denotes a cell selection quality value; or quality of the conditional reconfiguration candidate cell is better than a first threshold; or for a case where dual-connectivity is configured, when a radio link failure of a master cell group is detected, the quality of the conditional reconfiguration candidate cell is better than that of a PSCell or the quality of the conditional reconfiguration candidate cell is offset better than the PSCell; and when a radio link failure of a secondary cell group is detected, the quality of the conditional reconfiguration candidate cell is better than quality of a secondary cell of a secondary cell group or the quality of the conditional reconfiguration candidate cell is offset better than the secondary cell of the secondary cell group.

13. The apparatus according to claim 1, wherein the apparatus further comprises:

sixth executing processor circuitry configured to perform a behavior of reconfiguration failure when the conditional reconfiguration execution fails; or seventh executing processor circuitry configured to select another conditional reconfiguration candidate cell and attempt conditional reconfiguration execution once.

14. The apparatus according to claim 1, wherein, the conditional reconfiguration candidate cell comprises a conditional handover (CHO) candidate cell and/or a conditional PSCell change candidate cell.

15. An apparatus for processing a radio link failure, applicable to a network device, the apparatus comprising:

first configuring processor circuitry configured to configure a terminal equipment to attempt conditional reconfiguration execution after a radio link fail and/or configure the terminal equipment with information on a conditional reconfiguration candidate cell, wherein the terminal equipment is configured to perform cell selection, wherein the first selecting processor circuitry prioritizes a conditional reconfiguration candidate cell to select; or the terminal equipment is configured to perform cell selection; and first reselecting processor circuitry configured to perform cell reselection when a selected cell is not a conditional reconfiguration candidate cell; or the terminal equipment is configured to attempt conditional reconfiguration execution, wherein the terminal equipment is further configured to attempt conditional reconfiguration execution once when Access Stratum (AS) security has been activated and an Signaling Radio Bearer 2 (SRB2) and at least one Data Radio Bearer (DRB) have been setup, or, for an Integrated Access and Backhaul (IAB), when AS security has been activated and an SRB2 has been setup, and when a timer T316 is not configured or a secondary cell group (SCG) transmission is suspended or a primary secondary cell (-PSCell) change is ongoing, a third condition is fulfilled for a conditional reconfiguration candidate cell and the network configured the terminal equipment to try conditional reconfiguration execution or other similar behaviors after the radio link failure.

16. The apparatus according to claim 15, wherein the apparatus further comprises:

second configuring processor circuitry configured to configure the terminal equipment with a first timer and/or a value of the first timer, wherein when the terminal equipment scans radio frequency channels in an NR frequency band or when the terminal equipment scans radio frequency channels in an NR frequency band and the first timer is configured, the first timer is started, and when a suitable cell is found, the first timer is stopped.

17. The apparatus according to claim 15, wherein the apparatus further comprises:

third configuring processor circuitry configured to configure the terminal equipment with a parameter or a threshold or an offset used for a conditional reconfiguration candidate cell in an S criterion used in cell selection different from that used for a non-conditional reconfiguration candidate cell.

18. The apparatus according to claim 15, wherein, the apparatus further comprises:

seventh configuring processor circuitry configured to configure a cell reselection parameter for the terminal equipment, the configuring cell reselection parameter comprising: configuring a high priority for a conditional reconfiguration candidate frequency or a frequency where the conditional reconfiguration candidate cell is located, or configuring a low priority for a frequency other than a conditional reconfiguration candidate frequency or a frequency where the conditional reconfiguration candidate cell is located.

19. The apparatus according to claim 15, wherein, the apparatus further comprises:

seventh configuring processor circuitry configured to configure a cell reselection parameter for the terminal equipment, the configuring cell reselection parameter comprising: for an R criterion for ranking intra-frequency cells and inter-frequency cells of identical priorities, for the conditional reconfiguration candidate cell, configuring an offset different from that of a non-conditional reconfiguration candidate cell.

* * * * *